US007089205B1

(12) United States Patent
Abernethy

(10) Patent No.: US 7,089,205 B1
(45) Date of Patent: Aug. 8, 2006

(54) BASKET TRADING SYSTEM HAVING AN INTERFACE FOR USER SPECIFICATION OF GOODS TO BE TRADED AS A UNIT

(75) Inventor: William Randolph Abernethy, Agua Dulce, CA (US)

(73) Assignee: Unx, Inc., Burbank, CA (US)

( * ) Notice: Subject to any disclaimer, the term of this patent is extended or adjusted under 35 U.S.C. 154(b) by 924 days.

(21) Appl. No.: 09/672,838

(22) Filed: Sep. 29, 2000

(51) Int. Cl.
*G06F 17/60* (2006.01)

(52) U.S. Cl. .................. 705/37; 705/36 R; 715/748
(58) Field of Classification Search ................ 705/35, 705/36, 37, 36 R; 345/1.1, 55; 715/500, 715/700, 503, 748, 761; 709/201, 203
See application file for complete search history.

(56) References Cited

U.S. PATENT DOCUMENTS

| | | | | |
|---|---|---|---|---|
| 5,101,353 A | * | 3/1992 | Lupien et al. ................ | 705/37 |
| 5,132,899 A | | 7/1992 | Fox ............................ | 364/408 |
| 5,193,056 A | | 3/1993 | Boes .......................... | 364/408 |
| 5,517,406 A | | 5/1996 | Harris et al. ................ | 364/408 |
| 5,732,397 A | | 3/1998 | DeTore et al. ................ | 705/1 |
| 5,819,238 A | | 10/1998 | Fernholz ...................... | 705/36 |
| 6,035,287 A | * | 3/2000 | Stallaert et al. .............. | 705/37 |
| 6,092,056 A | * | 7/2000 | Tull et al. .................... | 705/36 |
| 6,098,051 A | * | 8/2000 | Lupien et al. ................ | 705/37 |
| 6,134,535 A | * | 10/2000 | Belzberg ...................... | 705/37 |
| 6,278,982 B1 | * | 8/2001 | Korhammer et al. ......... | 705/37 |
| 6,618,707 B1 | * | 9/2003 | Gary ............................ | 705/37 |
| 2002/0091617 A1 | * | 7/2002 | Keith .......................... | 705/37 |

FOREIGN PATENT DOCUMENTS

WO    WO 9527945 A1 * 10/1995

OTHER PUBLICATIONS

PR Newswire, Accutrade Inc., A Leader In Discount Brokerage, Introduces New Windows-Based Brokerage, Introduces New Windows-Based Brokerage Service, Apr. 2, 1996, p. 0402NYTU016.*

* cited by examiner

*Primary Examiner*—F. Zeender
(74) *Attorney, Agent, or Firm*—Staas & Halsey LLP

(57) ABSTRACT

The present invention is a system that provides the user with an downloadable, browser based interface that allows the user, based on his own preferences, to place fungible goods, such as stocks, in a basket as a list and trade all of the goods in the basket as a unit. The interface allows the user to execute trades in/of the basket in a single user action (i.e. one mouse click). A list region is provided where the goods are listed and an execute control initiates trading of the goods in the basket. The user can also specify an amount to be invested, goods weights, a measurement index and how the trades are to be limited. The interface presents, allows changes in (open, close, balance, etc.), summarizes and records the goods transactions as/within the unit basket.

1 Claim, 35 Drawing Sheets

[unx.com] / account selection

30

| Account ID | Type | Status | Customer ID | Customer Name | Access Level |
|---|---|---|---|---|---|
| 100026 | Cash | Open | 100013 | UNX.COM, Inc. | Inquiry |

34 [Select]

• • • • • • • • • • • • • • • • • • • • • • • • • • • • • • • • • • • • • • • • • •

Copyright © 2000 UNX.COM, Inc., all right reserved. Member NASD/SIPC
FLEXII, MultiQuote, MyFund, Individual Fund, IF, UNX and Universal Network
Exchange are Trademarks of UNX.COM, Inc., Patents Pending

FIG. 3

From: FLEXII@UNX.COM
Sent: Thursday, June 22, 2000 11:37 AM
To: ITAlert@unx.com,randy@unx.com,irene@unx.com
Subject: Confirmation for IF: 1695

IF Trade Confirmation

Broker:         Universal Network Exchange, LLC. —— 24
Account ID:     100026 —— 242
Customer Name:  UNX.COM, Inc. —— 243
Customer ID:    100013
Contact ID:     100045
Position:       Open —— 246
Trade Date:     06/22/2000 —— 247
Settle Date:    06/27/2000 —— 248
EMail Date:     06/22/2000 10:36:35 Pacific Daylight Time —— 249
EMail List:     ITAlert@unx.com, randy@unx.com, irene@unx.com —— 250

244 ——
245 ——

229

| ID | Symbol | Description | CUSIP | Time | Side | Shares | Price | Principal | Comm | Fee | Net Money |
|---|---|---|---|---|---|---|---|---|---|---|---|
| 63223 | AOL | AMERICA ONLINE INC. | 02364J104 | 10:35:48 | BUY | 200 | 57.0000 | 11,400.00 | 10.00 | 0.00 | 11,410.00 |
| 63221 | CSCO | CISCO SYSTEMS, INC. | 17275R102 | 10:35:48 | BUY | 800 | 65.6250 | 52,500.00 | 20.00 | 0.00 | 52,520.00 |
| 63224 | DELL | DELL COMPUTER CORPRORATION | 247025109 | 10:35:48 | BUY | 300 | 49.5000 | 14,850.00 | 10.00 | 0.00 | 14,860.00 |
| 63222 | IBM | IBM | 459200101 | 10:35:48 | BUY | 200 | 113.1250 | 22,625.00 | 10.00 | 0.00 | 22,635.00 |
| 1695 | RBHot | | | | | 1500 | 67.5833 | 101,375.00 | 50.00 | 0.00 | 101,425.00 |
| 230 | 231 | 232 | 233 | 234 | 235 | 236 | 237 | 238 | 239 | 240 | 241 |

FIG. 8

⊠ / adjust SB

Account: 100000
Customer: Oscarito Family Limited Partnership (100003)

Stock Basket Balancer

Enter a positive Inflow/Outflow dollar (USD) amount to add principal to the SB. Enter a negative Inflow/Outflow dollar (USD) amount to remove principal from the SB. Use the "Share Threshold" to enter a minimum number of shares to trade. Select " Do not close to Rebalance" to keep (rather than trimming back) over balanced positions. Select Round Lots Only to round all trades to the nearest 100 shares. To add securities to the SB, enter additional symbols in the Symbols text box. To remove securities from the SB, remove symbols from the Symbols text box. All weighting mechanisms other than "User Defined" will automatically reweight assets in the SB.

Inflow/Outflow: 0.00  — 264

Asset Weighting: Dollar — 266
Share Threshold: 0 — 268
Do not close to Rebalance: ☐ — 270
Round Lots Only: ☐ — 272
Symbols:
NITE
INRS
DCLK
EXDS
YHOO
AEIS
CMGI
FIBR
— 274

278 — [Preview Order]   [Cancel Order] — 276

Current Positions

260

| Symbol | Quantity | B/S | Current Price | Market Value | |
|--------|----------|-----|---------------|--------------|---|
| NITE | 860 | B | . | $29,777.50 | Move |
| INRS | 598 | B | . | $30,199.00 | Move |
| DCLK | 894 | B | . | $30,340.13 | Move |
| EXDS | 607 | B | . | $29,705.06 | Move |
| YHOO | 313 | B | . | $29,461.13 | Move |
| AEIS | 858 | B | . | $30,030.00 | Move |
| CMGI | 1,003 | B | . | $29,149.69 | Move |
| FIBR | 1,162 | B | . | $29,631.00 | Move |
| GNET | 552 | B | . | $29,670.00 | Move |
| LCOS | 427 | B | . | $29,729.98 | Move |
| B10 | 7,274 | | 40.9257 | $297,693.38 | |

[unx.com]/ close IF

Close IF Order

Account: 100026
Customer: UNX.COM, Inc. (100013)

280

Preview generated at: 06/19/2000 15:33:00 Pacific Daylight Time

| Symbol | Quantity | B/S | Current Price | Market Value | Close |
|---|---|---|---|---|---|
| CSCO | (89) | S | * | $6,129.88 | ☑ |
| IBM | (22) | S | * | $2,631.75 | ☑ |
| AOL | (29) | S | * | $1,576.88 | ☑ |
| Tech Trio | 140 | Close | 73.8464 | $10,338.50 | |

282 ↗    284

Uncheck — 286

Warning: Executing this order will submit orders for each asset listed in the quantities specified. The Expected pricing information is provided as a base approximation only. The price that your order will actually be executed at may vary widely from these figures. The FLEXII execution system is highly optimized for rapid order execution. Once submitted you will not be able to cancel this order. This is your last chance to cancel the above order. This order is not pending and will not be executed unless you click the Execute Order button below.

[ Execute Order ] — 290        [ Cancel Order ] — 288

- control center
- open IF position
- create gallery IF
- account history
- asset search
- log-out Copyright © 2000 UNX.COM, Inc., all right reserved. Member NASD/SIPC
• FLEXII, MultiQuote, MyFund, Individual Fund, IF, UNX and Universal Network
• Exchange are Trademarks of UNX.COM, Inc., Patents Pending

FIG. 10

[unx.com]/ open IF

Open IF Order
Preview generated at: 06/16/2000 11:29:32 Pacific Daylight Time

| Symbol | Quantity | B/S | Current Price | Market Value |
|---|---|---|---|---|
| AA | 37 | B | · | $1,184.00 |
| AXP | 69 | B | · | $3,635.44 |
| T | 162 | B | · | $5,447.25 |
| BA | 47 | B | · | $1,844.75 |
| CAT | 18 | B | · | $655.87 |
| C | 174 | B | · | $10,918.50 |
| KO | 128 | B | · | $7,136.00 |
| DD | 54 | B | · | $2,558.25 |
| EK | 16 | B | · | $953.00 |
| XOM | 180 | B | · | $15,120.00 |
| GE | 512 | B | · | $26,496.00 |
| GM | 32 | B | · | $2,068.00 |
| HD | 119 | B | · | $5,927.69 |
| HON | 41 | B | · | $2,065.38 |
| HWP | 51 | B | · | $5,925.56 |
| IBM | 91 | B | · | $10,573.06 |
| INTC | 173 | B | · | $22,273.75 |
| IP | 21 | B | · | $694.31 |
| JPM | 8 | B | · | $962.00 |
| JNJ | 72 | B | · | $6,498.00 |
| MCD | 69 | B | · | $2,233.88 |
| MRK | 119 | B | · | $8,654.94 |
| MSFT | 272 | B | · | $19,839.00 |
| MMM | 20 | B | · | $1,712.50 |
| MO | 118 | B | · | $3,127.50 |
| PG | 67 | B | · | $3,760.38 |
| SBC | 176 | B | · | $8,426.00 |
| UTX | 24 | B | · | $1,443.00 |
| WMT | 231 | B | · | $12,690.56 |
| DIS | 107 | B | · | $4,453.88 |
| DOW | 3,208 | Open | 62.1128 | $199,257.94 |

Sidebar buttons: control center, open IF position, create gallery IF, account history, asset search, log-out

380

382

[ Execute Order ] 384       [ Cancel Order ] 386

Warning: Executing this order will submit orders for each asset listed in the quantities specified. The pricing information displayed is provided as a base approximation only. The price that your order will actually be executed at may vary widely from these figures. The FLEXII execution system is highly optimized for rapid order execution. Once submitted you will not be able to cancel this order. This is your last chance to cancel the above order. This order is not pending and will not be executed unless you click the Execute Order button below.

Copyright © 2000 UNX.COM, Inc., all right reserved. Member NASO/SIPC • FLEXII, MultiQuote, MyFund, Individual Fund, IF, UNX and Universal Network Exchange are Trademarks of UNX.COM, Inc., Patents Pending

FIG. 13

Open IF Detail

Broker: Universal Network Exchange, LLC.  Customer Name: UNX.COM, Inc.
Account ID: 100026                        Customer ID: 100013
Position: Open                            Display Date: 06/19/2000 15:29:13 Pacific Daylight Time

[ Assets ] [ Executions ]—414

| ID | Name/Symbol | Date/Time | Shares | Price | Principal | Comm | Fee | Net Money | CMV | Gain/Loss |
|---|---|---|---|---|---|---|---|---|---|---|
| 1564 | Tech Trio | 06/12/2000 12:21:18 | 140 | 70.3366 | 9,847.12 | 30.00 | 0.00 | 9,877.12 | 10,364.19 | 487.06 |
| 57710 | AOL | 06/12/2000 12:21:18 | 29 | 52.8750 | 1,533.38 | 10.00 | 0.00 | 1,543.38 | 1,580.50 | 37.13 |
| 57708 | CSCO | 06/12/2000 12:21:18 | 89 | 63.7500 | 5,673.75 | 10.00 | 0.00 | 5,683.75 | 6,135.44 | 451.69 |
| 57709 | IBM | 06/12/2000 12:21:18 | 22 | 120.0000 | 2,640.00 | 10.00 | 0.00 | 2,650.00 | 2,648.25 | (1.75) |

410

412

(Click any row to collapse/expand children)

Copyright © 2000 UNX.COM, Inc., all right reserved. Member NASD/SIPC
FLEXII, MultiQuote, MyFund, Individual Fund, IF, UNX and Universal Network
Exchange are Trademarks of UNX.COM, Inc., Patents Pending

FIG. 14

Open IF Detail

| Broker: | Universal Network Exchange, LLC. | Customer Name: | UNX.COM, Inc. |
|---|---|---|---|
| Account ID: | 100026 | Customer ID: | 100013 |
| Position: | Open | Display Date: | 06/19/2000 15:29:13 Pacific Daylight Time |

[ Assets ] [ Executions ]

_420_

422

| ID | Name/Symbol | Date/Time | Shares | Price | Principal | Comm | Fee | Net Money | CMV | Gain/Loss |
|---|---|---|---|---|---|---|---|---|---|---|
| 1564 | Tech Trio | 06/12/2000 12:21:18 | 140 | 70.3366 | 9,847.12 | 30.00 | 0.00 | 9,877.12 | 10,364.19 | 487.06 |
| 57710 | AOL | 06/12/2000 12:21:18 | 29 | 52.8750 | 1,533.38 | 10.00 | 0.00 | 1,543.38 | 1,580.50 | 37.13 |
|  | AOL | 06/12/2000 12:21:23 | 29 | 52.8750 | 1,533.38 | 10.00 | 0.00 | 1,543.38 |  |  |
| 57708 | CSCO | 06/12/2000 12:21:18 | 89 | 63.7500 | 5,673.75 | 10.00 | 0.00 | 5,683.75 | 6,135.44 | 451.69 |
|  | CSCO | 06/12/2000 12:21:35 | 89 | 63.7500 | 5,673.75 | 10.00 | 0.00 | 5,683.75 |  |  |
| 57709 | IBM | 06/12/2000 12:21:18 | 22 | 120.0000 | 2,640.00 | 10.00 | 0.00 | 2,650.00 | 2,648.25 | (1.75) |
|  | IBM | 06/12/2000 12:21:25 | 22 | 120.0000 | 2,640.00 | 10.00 | 0.00 | 2,650.00 |  |  |

(Click any row to collapse/expand children)

Copyright © 2000 UNX.COM, Inc., all right reserved. Member NASD/SIPC
FLEXII, MultiQuote, MyFund, Individual Fund, IF, UNX and Universal Network
Exchange are Trademarks of UNX.COM, Inc., Patents Pending

FIG. 15

[unx]/ history
Universal Network Exchange

Account: 100000
Customer: Oscarito Family Limited Partnership (100003)

SB History

| Name | ID | Open Date | Close Date | Buy Net/Open | Sell Net/CMV | Gain/Loss |
|---|---|---|---|---|---|---|
| B20 | 2797 | 09/28/2000 | Open | $399,565.39 | $400,015.09 | $449.71 |
| B10 | 2796 | 09/28/2000 | Open | $300,104.18 | $299,725.94 | ($378.24) |
| Qshort | 2751 | 09/28/2000 | 09/28/2000 | $74,175.00 | $72,660.33 | ($1,514.67) |
| T5 | 2750 | 09/27/2000 | Open | $499,861.01 | $511,884.67 | $12,023.66 |
| B20 | 2717 | 09/22/2000 | 09/25/2000 | $400,014.22 | $398,989.12 | ($1,025.10) |
| Nshort | 2684 | 09/21/2000 | Open | ($39,080.73) | ($40,937.50) | ($1,856.77) |
| | | | Total: | $1,634,639.07 | $1,642,337.66 | $7,698.58 |

Click on an SB ID to display SB details.

- control center
- open SB position
- create gallery SB
- account history
- asset search
- log-out Copyright © 2000 UNX.COM, Inc., all right reserved. Member NASD/SIPC
FLEXII, MultiQuote, MyFund, Individual Fund, IF, UNX and Universal Network
Exchange are Trademarks of UNX.COM, Inc., Patents Pending

FIG. 16B

[unx]/ history
Universal Network Exchange

Account: 100000
Customer: Oscarito Family Limited Partnership (100003)

- control center
- open SB position
- create gallery SB
- account history
- asset search
- log-out

SB History

| Name | ID | Open Date | Close Date | Buy Net/Open | Sell Net/CMV | Gain/Loss |
|------|------|------------|------------|--------------|---------------|-------------|
| B10 | 2796 | 09/23/2000 | Open | $330,104.18 | $299,725.94 | ($376.24) |
| B10 | 2869 | 09/19/2000 | 09/21/2000 | $301,200.58 | $292,514.83 | ($8,685.75) |
| B10 | 2584 | 09/13/2000 | 09/15/2000 | $300,050.74 | $293,846.83 | ($6,203.91) |
| B10 | 2519 | 09/07/2000 | 09/08/2000 | $299,165.44 | $286,076.13 | ($13,089.31) |
| B10 | 2439 | 08/30/2000 | 09/05/2000 | $299,663.23 | $298,273.26 | ($1,389.97) |
| B10 | 2426 | 08/28/2000 | 08/29/2000 | $300,553.78 | $298,169.53 | ($2,384.26) |
| B10 | 2272 | 08/11/2000 | 08/25/2000 | $301,240.60 | $329,694.75 | $28,454.15 |
| B10 | 2186 | 08/04/2000 | 08/09/2000 | $300,157.49 | $308,520.16 | $8,362.67 |
| B10 | 2127 | 07/31/2000 | 08/01/2000 | $300,394.14 | $292,036.81 | ($8,357.33) |
| B10 | 2051 | 07/25/2000 | 07/27/2000 | $300,276.22 | $296,020.69 | ($4,255.53) |
| B10 | 2009 | 07/20/2000 | 07/21/2000 | $300,309.42 | $287,693.01 | ($12,616.41) |
| | | | Total: | $3,303,115.60 | $3,282,571.92 | ($20,543.89) |

Click on an SB ID to display SB details.

Copyright © 2000 UNX.COM, Inc., all right reserved. Member NASD/SIPC
FLEXII, MultiQuote, MyFund, Individual Fund, IF, UNX and Universal Network
Exchange are Trademarks of UNX.COM, Inc., Patents Pending

FIG. 16C

[unx]/ history
Universal Network Exchange

Account: 100000
Customer: Oscarito Family Limited Partnership (100003)

SB History

| Name | ID | Open Date | Close Date | Buy Net/Open | Sell Net/CMV | Gain/Loss |
|------|------|------------|------------|--------------|--------------|-----------|
| T5 | 2750 | 09/27/2000 | Open | $499,861.01 | $511,884.67 | $12,023.66 |
| | | | Total: | $499,861.01 | $511,884.67 | $12,023.66 |

Click on an SB ID to display SB details.

- control center
- open SB position
- create gallery SB
- account history
- asset search
- log-out Copyright © 2000 UNX.COM, Inc., all right reserved. Member NASD/SIPC
FLEXII, MultiQuote, MyFund, Individual Fund, IF, UNX and Universal Network
Exchange are Trademarks of UNX.COM, Inc., Patents Pending

FIG. 16D

[unx]/ history
Universal Network Exchange

Account: 100000
Customer: Oscarito Family Limited Partnership (100003)

Asset History

| | ID | Symbol | Entered At | Qty | Price | Total | IF ID |
|---|---|---|---|---|---|---|---|
| control center | 109982 | EXDS | 09/28/2000 12:53:59 | 405 | 49.3438 | $19,984.22 | 2797 |
| | 109983 | RNWK | 09/28/2000 12:53:59 | 492 | 40.5938 | $19,972.13 | 2797 |
| open SB position | 109980 | PVN | 09/28/2000 12:53:59 | 154 | 129.6250 | $19,962.25 | 2797 |
| | 109981 | RSAS | 09/28/2000 12:53:59 | 437 | 45.8072 | $20,017.75 | 2797 |
| create gallery SB | 109979 | ITWO | 09/28/2000 12:53:59 | 104 | 190.5000 | $19,812.00 | 2797 |
| | 109978 | MWD | 09/28/2000 12:53:59 | 222 | 90.000 | $19,980.00 | 2797 |
| account history | 109977 | LCOS | 09/28/2000 12:53:59 | 284 | 70.2188 | $19,942.13 | 2797 |
| | 109976 | FWJ | 09/28/2000 12:53:59 | 285 | 70.1875 | $20,003.44 | 2797 |
| asset search | 109974 | MER | 09/28/2000 12:53:59 | 306 | 65.1875 | $19,947.38 | 2797 |
| | 109975 | SCH | 09/28/2000 12:53:59 | 569 | 35.1250 | $19,986.13 | 2797 |
| log-out | 109972 | CMGI | 09/28/2000 12:53:59 | 668 | 29.9063 | $19,977.38 | 2797 |
| | 109973 | INKT | 09/28/2000 12:53:59 | 168 | 118.3817 | $19,888.13 | 2797 |
| | 109971 | TERN | 09/28/2000 12:53:59 | 576 | 34.8422 | $20,069.13 | 2797 |
| | 109970 | DLJ | 09/28/2000 12:53:59 | 223 | 89.4375 | $19,944.56 | 2797 |
| | 109969 | MUSE | 09/28/2000 12:53:59 | 95 | 209.5000 | $19,902.50 | 2797 |
| | 109967 | AFCI | 09/28/2000 12:53:59 | 525 | 38.0426 | $19,972.34 | 2797 |
| | 109968 | VIXT | 09/28/2000 12:53:59 | 470 | 42.5000 | $19,975.00 | 2797 |
| | 109966 | LEH | 09/28/2000 12:53:59 | 135 | 147.2500 | $19,878.75 | 2797 |
| | 109665 | MRVC | 09/28/2000 12:53:59 | 421 | 47.8539 | $20,146.50 | 2797 |
| | 109964 | ZRAN | 09/28/2000 12:53:52 | 384 | 52.0303 | $19,979.63 | 2797 |
| | 109962 | GNET | 09/28/2000 12:53:52 | 552 | 54.3125 | $29,980.50 | 2796 |
| | 109963 | LCOS | 09/28/2000 12:53:52 | 427 | 70.1329 | $29,946.75 | 2796 |
| | 109960 | CMGI | 09/28/2000 12:53:52 | 1,003 | 29.9219 | $30,011.69 | 2796 |
| | 109961 | FIBR | 09/28/2000 12:53:52 | 1,162 | 25.8125 | $29,994.13 | 2796 |
| | 109959 | AEIS | 09/28/2000 12:53:52 | 858 | 35.0000 | $30,030.00 | 2796 |
| | 109957 | EXDS | 09/28/2000 12:53:52 | 607 | 49.3438 | $29,951.66 | 2796 |

FIG. 16E-1

[unx]/ history
Universal Network Exchange

Asset History

Account: 100000
Customer: Oscarito Family Limited Partnership (100003)

- control center
- open SB position
- create gallery SB
- account history
- asset search
- log-out

| ID | Symbol | Entered At | Qty | Price | Total | IF ID |
|---|---|---|---|---|---|---|
| 109958 | YHOO | 09/28/2000 12:53:52 | 313 | 95.7300 | $29,963.50 | 2796 |
| 109956 | DCLK | 09/28/2000 12:53:52 | 894 | 33.5638 | $30,006.06 | 2796 |
| 109955 | INRS | 09/28/2000 12:53:52 | 598 | 50.2398 | $30,043.38 | 2796 |
| 109954 | NITE | 09/28/2000 12:53:52 | 860 | 34.8750 | $29,992.50 | 2796 |
| 108484 | NOK | 09/28/2000 11:58:49 | 500 | 41.1875 | $20,593.75 | 2684 |
| 108483 | NOK | 09/28/2000 11:55:16 | 500 | 41.1875 | $20,593.75 | 2684 |
| 108482 | QCOM | 09/28/2000 10:53:52 | 500 | 74.8750 | $37,437.50 | 2751 |
| 108481 | QCOM | 09/28/2000 09:01:49 | 500 | 73.4250 | $36,712.50 | 2751 |
| 108480 | NOK | 09/28/2000 08:54:37 | 2,000 | 40.3750 | $80,750.00 | 2684 |
| 108479 | SUNW | 09/28/2000 08:45:52 | 158 | 120.4374 | $18,788.24 | 2750 |
| 108478 | MSFT | 09/28/2000 08:45:52 | 314 | 61.6222 | $19,349.38 | 2750 |
| 108477 | ORCL | 09/28/2000 08:45:52 | 263 | 79.3453 | $20,867.81 | 2750 |
| 108476 | INTC | 09/28/2000 08:45:52 | 447 | 44.2220 | $19,767.25 | 2750 |
| 108475 | CSCO | 09/28/2000 08:45:52 | 371 | 56.9375 | $21,123.81 | 2750 |
| 108474 | NOK | 09/28/2000 07:34:12 | (1,000) | 39.5625 | ($39,562.50) | 2684 |
| 108473 | QCOM | 09/28/2000 07:00:46 | (1,000) | 72.6878 | ($72,687.75) | 2751 |
| 108472 | NOK | 09/28/2000 06:59:54 | (1,000) | 39.3750 | ($38,375.00) | 2684 |
| 108471 | SUNW | 09/27/2000 12:56:57 | 677 | 118.0625 | $79,928.31 | 2750 |
| 108469 | MSFT | 09/27/2000 12:56:57 | 1,318 | 60.6563 | $79,944.94 | 2750 |
| 108470 | ORCL | 09/27/2000 12:56:57 | 1,002 | 79.7813 | $79,940.81 | 2750 |
| 108467 | CSCO | 09/27/2000 12:56:57 | 1,393 | 57.4106 | $79,972.94 | 2750 |
| 108468 | INTC | 09/27/2000 12:56:57 | 1,824 | 43.8438 | $79,971.00 | 2750 |
| | | Totals: | 22,962 | | ($1,243,378.20) | |

Click on an IF ID to display IF details.

Copyright © 2000 UNX.COM, Inc., all right reserved. Member NASO/SIPC
FLEXII, MultiQuote, MyFund, Individual Fund, IF, UNX and Universal Network
Exchange are Trademarks of UNX.COM, Inc., Patents Pending

FIG. 16E-2

[unx]/ history
Universal Network Exchange

Asset History

| | ID | Symbol | Entered At | Qty | Price | | Total | IF ID |
|---|---|---|---|---|---|---|---|---|
| | 108475 | CSCO | 09/28/2000 08:45:52 | 371 | 56.9375 | | $21,123.81 | 2750 |
| | 108467 | CSCO | 09/27/2000 12:56:57 | 1,393 | 57.4106 | | $79,972.94 | 2750 |
| | 105968 | CSCO | 09/21/2000 12:58:51 | (969) | 61.1480 | | ($59,262.37) | 2668 |
| | 105258 | CSCO | 09/21/2000 07:05:43 | (652) | 62.0625 | | ($40,464.75) | 2668 |
| | | | Totals: | 143 | | | ($1,379.63) | |

Account: 100000
Customer: Oscarito Family Limited Partnership (100003)

Click on an IF ID to display IF details.

- control center
- open SB position
- create gallery SB
- account history
- asset search
- log-out Copyright © 2000 UNX.COM, Inc., all right reserved. Member NASD/SIPC FLEXI, MultiQuote, MyFund, Individual Fund, IF, UNX and Universal Network Exchange are Trademarks of UNX.COM, Inc., Patents Pending

FIG. 16F

[unx]/ history
Universal Network Exchange

Asset History

| | ID | Symbol | | Entered At | Qty | Price | Account: | 100000 |
|---|---|---|---|---|---|---|---|---|
| | 105258 | CSCO | | 09/21/2000 07:05:43 | (652) | 62.0625 | Customer: | Oscarito Family Limited Partnership (100003) |
| | | | Totals: | | (652) | | Total | IF ID |
| | | | | | | | ($40,464.75) | 2368 |
| | | | | | | | $40,464.75 | |

Click on an IF ID to display IF details.

- control center
- open SB position
- create gallery SB
- account history
- asset search
- log-out Copyright © 2000 UNX.COM, Inc., all right reserved. Member NASD/SIPC • FLEXII, MultiQuote, MyFund, Individual Fund, IF, UNX and Universal Network Exchange are Trademarks of UNX.COM, Inc., Patents Pending

FIG. 16G

[unx.com]/move

| control center |
| open IF position |
| create gallery IF |
| account history |
| asset search |
| log-out |

Account: 100026
Customer: UNX.COM, Inc. (100013)

Current IF: Aggressive Growth (3293)

Asset: 1,200 MSFT

Select target IF from Gallery — 510

| Name | ID | Date | Side | Type | IFI | CMV | Move To: |
|---|---|---|---|---|---|---|---|
| DOW | 1265 | 07/25/2000 | Long | PRI | NAV | $200,000.00 | Preview — 512 |
| Growth 10 | 1345 | 06/29/2000 | Long | CAP | NAV | $100,000.00 | Preview |
| max basket | 1403 | 07/17/2000 | Long | DLR | NAV | $10,000.00 | Preview |
| PSM Stocks | 1302 | 06/27/2000 | Long | CAP | NAV | $50,000.00 | Preview |
| Wired | 1317 | 06/27/2000 | Short | DLR | NAV | $100,000.00 | Preview |

Gallery IFs are staged for fast execution but do not represent open positions.
Click on an IF Name to display details.

Copyright © 2000 UNX.COM, Inc., all right reserved. Member NASD/SIPC
FLEXII, MultiQuote, MyFund, Individual Fund, IF, UNX and Universal Network
Exchange are Trademarks of UNX.COM, Inc., Patents Pending

FIG. 17

[unx.com]/rotate

Account: 100026
Customer: UNX.COM, Inc. (100013)

Current IF: Aggressive Growth (3293)

Select target IF from Gallery

550

| Name | ID | Date | Side | Type | IFI | CMV | Rotate To: |
|---|---|---|---|---|---|---|---|
| DOW | 1265 | 07/25/2000 | Long | PRI | NAV | $200,000.00 | Preview — 552 |
| Growth 10 | 1345 | 06/29/2000 | Long | CAP | NAV | $100,000.00 | Preview |
| max basket | 1403 | 07/17/2000 | Long | DLR | NAV | $10,000.00 | Preview |
| PSM Stocks | 1302 | 06/27/2000 | Long | CAP | NAV | $50,000.00 | Preview |
| Wired | 1317 | 06/27/2000 | Short | DLR | NAV | $100,000.00 | Preview |

*Gallery IFs are staged for fast execution but do not represent open positions.
Click on an IF Name to display details.*

- control center
- open IF position
- create gallery IF
- account history
- asset search
- log-out Copyright © 2000 UNX.COM, Inc., all right reserved. Member NASD/SIPC
FLEXII, MultiQuote, MyFund, Individual Fund, IF, UNX and Universal Network Exchange are Trademarks of UNX.COM, Inc., Patents Pending

FIG. 18

[unx.com]/subaccount contribution

| Account ID | Type | Status | Customer ID | Customer Name | Principal | |
|---|---|---|---|---|---|---|
| 100012 | Margin | Open | 100013 | Teldar Paper, Inc. | $65,000 | View |
| 100014 | Margin | Open | 100013 | The Gecko Family | $1,235,000 | View |
| 100019 | Cash | Open | 100013 | Darryl Smith | $55,000 | View |
| 100026 | Cash | Open | 100013 | The Simpson Trust | $85,678 | View |

Accept

Copyright © 2000 UNX.COM, Inc., all right reserved. Member NASO/SIPC
FLEXII, MultiQuote, MyFund, Individual Fund, IF, UNX and Universal Network
Exchange are Trademarks of UNX.COM, Inc., Patents Pending

[unx.com]/enter IF

Account: 100026
Customer: UNX.COM, Inc. (100013)

Open IF Position

- control center
- open IF position
- create gallery IF
- account history
- asset search
- Log-out

| | | |
|---|---|---|
| IF Name: | Tech10 | — 612 |
| Maximum Dollar Amount: | 1000000 | — 614 |
| Minimum Dollar Amount: | 10000 | — 616 |
| Buy or Sell: | Buy ▼ | — 618 |
| Market Order: | ○ | |
| Limit Order: | ◉ | } 620 |
| Limit Order NAV: | 75.50 | — 622 |
| Stop: | 624 — ☑ | |
| Stop NAV: | 75.00 | — 626 |
| Asset Weighting: | CAP ▼ | — 628 |
| Allowed Variance: | 10 | — 630 |
| Time In Force: | 99999 | — 632 |

Symbols to Order (separated by spaces, commas or returns):

```
MSFT
INTC
DELL
CSCO
IBM
HWP
WCOM
CPQ
ORCL
SUNW
```
634

User Defined IFs must have share quantities or composition percentages following each symbol.

636 — [ Preview Order ]    [ Clear Order ] — 638

Copyright © 2000 U
FLEXII, MultiQuote, I
Exchange are Tradem

FIG. 22

[unx.com]/gallery

IF Gallery

Account: 100026
Customer: UNX.COM, Inc. (100013)

| Name | ID | Date | Side | Type | Last | Bid | Ask | Var | CMV | Open |
|---|---|---|---|---|---|---|---|---|---|---|
| DOW | 1265 | 07/25/2000 | Long | PRI | 75.125- | 75.125 | 75.187 | $17,000 | $200,000.00 | Preview |
| Growth 10 | 1345 | 06/29/2000 | Long | CAP | 27.875+0 | 27.750 | 27.875 | $5,000 | $100,000.00 | Preview |
| max basket | 1403 | 07/17/2000 | Long | DLR | 86.125- | 86.000 | 86.187 | | $10,000.00 | Preview |
| PSM Stocks | 1302 | 06/27/2000 | Long | CAP | 71.500+ | 71.375 | 71.500 | | $50,000.00 | Preview |
| Wired | 1317 | 06/27/2000 | Short | DLR | 93.375+ | 93.250 | 93.500 | | $100,000.00 | Preview |

652

*Gallery IFs are staged for last execution but do not represent open positions.*
*Click on an IF Name to display details.*

[control center]
[open IF position]
[create gallery IF]
[account history]
[asset search]
[log-out]

Copyright © 2000 UNX.COM, Inc., all right reserved. Member NASD/SIPC
FLEXfi, MultiQuote, MyFund, Individual Fund, IF, UNX and Universal Network
Exchange are Trademarks of UNX.COM, Inc., Patents Pending

[unx.com]/enter IF

Account: 100026
Customer: UNX.COM, Inc. (100013)

- control center
- open IF position
- create gallery IF
- account history
- asset search
- log-out

Open IF Position

| | |
|---|---|
| IF Name: | Custom Routing |
| Dollar Amount: | 100000 |
| Share Threshold: | 50 |
| Buy or Sell: | Buy ▽ |
| Asset Weighting: | Dollar ▽ |
| Individual Fund Index Type: | NAV (Net Asset Value) ▽ |
| Lot Size: | Odd Lots OK ▽ |

Symbols to Order (separated by spaces, commas or returns):

```
INTC      #ISLD
CSCO      #SLKC
MSFT
DELL      #NITE
WCII
VRTS     #REDI
```

664 → (INTC arrow), 666 → (#ISLD area), 662 → (#REDI), 668 → (#NITE)

User Defined IFs must have share quantities or composition percentages following each symbol.

[ Preview Order ]    [ Clear Order ]

Copyright © 2000 U
FLEXII, MullQuote, I
Exchange are Tradem

BASKET TRADING SYSTEM HAVING AN INTERFACE FOR USER SPECIFICATION OF GOODS TO BE TRADED AS A UNIT

CROSS REFERENCE TO RELATED APPLICATIONS

This application is related to U.S. provisional patent application Ser. No. 60/110,524, filed Dec. 1, 1998, entitled "METHOD AND APPARATUS FOR TRADING USER-DEFINABLE GROUPS OF FUNGIBLE GOODS SUCH AS SECURITIES," by William Randolph Abernethy et al.; U.S. patent application Ser. No. 09/433,659, filed Nov. 3, 1999, entitled "METHOD AND SYSTEM FOR TRADING USER DEFINABLE BASKETS OF FUNGIBLE GOODS SUCH AS SECURITIES," by William Randolph Abernethy et al.; U.S. patent application Ser. No. 09/675,583, filed concurrently herewith, entitled "AN ELECTRONIC CROSSING SYSTEM FOR SECURITY BASKETS," by William Randolph Abernethy; U.S. patent application Ser. No. 09/672,840 filed concurrently herewith, entitled "A BASKET PRICE QUOTATION SYSTEM," by William Randolph Abernethy; and U.S. patent application Ser. No. 09/672,839, filed concurrently herewith, entitled "AN ORDER ROUTING SYSTEM FOR FUNGIBLE GOODS TRADES IN A BASKET TRADING SYSTEM," by William Randolph Abernethy, all incorporated by reference herein.

BACKGROUND OF THE INVENTION

1. Field of the Invention

The present invention is directed to a system allowing a user to trade a multi-issue basket of securities using an interface at the users computer and, more particularly, to a system which downloads an interface to the user which allows the user to specify basket contents and initiate trading of the basket as a unit.

2. Description of the Related Art

Online trading of stocks and other goods allows a trader/user to select stocks to trade and initiate orders for trading using a single issue trading interface. However, it has become of interest to the financial community to trade a group of stocks. To do so, the trader must create and initiate orders individually for each stock that the user may want to place in the group.

What is needed is a system having an interface that allows the user to trade a basket of stocks and other fungible goods as a unit.

Once a user has obtained a group of stocks, when the user wishes to change the group, such as by selling the group, balancing the group against a target, etc., the user must perform individual transactions for the changes using the single issue interface.

What is needed is an interface that treats a basket of stocks as a unit allowing the user to trade all of the stocks of the basket together.

SUMMARY OF THE INVENTION

It is an object of the present invention to provide an interface that allows a user to specify a basket of fungible goods to be traded as a unit.

It is another object of the present invention to provide an interface with a control allowing initiation of trading of a basket as a unit in a single trade initiation.

It is also an object of the present invention to provide an interface that treats the goods of a basket as a unit throughout transactions with respect to the basket.

It is a further object of the present invention to provide an interface that allows a user to track a net asset value (NAV) of a basket.

It is an object of the present invention to allow a user to provide an interface that allows a user to trade a single good within a basket or a single good.

It is still another object of the present invention to provide an interface with a control allowing a basket to be re-balanced.

It is a still further object of the present invention to provide an interface that allows a user to search for an asset across baskets.

It is an object of the present invention to display previously traded baskets in several useful ways—by basket type (allows perusal of program performance) and by asset baskets (allows tax lot optimization.

It is another object of the present invention to display basket bid and ask NAV quotes at the market.

It is an additional object of the present invention to consistently track a basket NAV across corporate actions (like stock splits) and ad hoc adjustments by the trader.

The above objects can be attained by a system that provides the user with an interface that allows the user to place fungible goods, such as stocks, in a basket and trade all of the goods in the basket as a unit. The interface allows the user to execute trades in/of the basket in a single user action. The interface presents, allows changes in (open, close, balance, etc.), summarizes and records the goods as the unit basket.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 depicts an account selection view or page.

FIG. 8 depicts an e-mail confirmation.

FIG. 9 shows a basket balancer interface.

FIG. 10 depicts basket close interface.

FIG. 13 is a view of basket contents.

FIG. 14 shows a view of basket details.

FIG. 15 depicts transactions/executions of a basket.

FIG. 17 depicts an asset move interface.

FIG. 18 shows a basket rotate interface.

FIG. 21 depicts sub account contributions.

FIG. 22 shows a basket trading interface used for trading baskets on a basket ECN.

FIG. 23 depicts a gallery view showing variances.
FIG. 24 shows a custom router interface.

DESCRIPTION OF THE PREFERRED EMBODIMENTS

Figure 1:
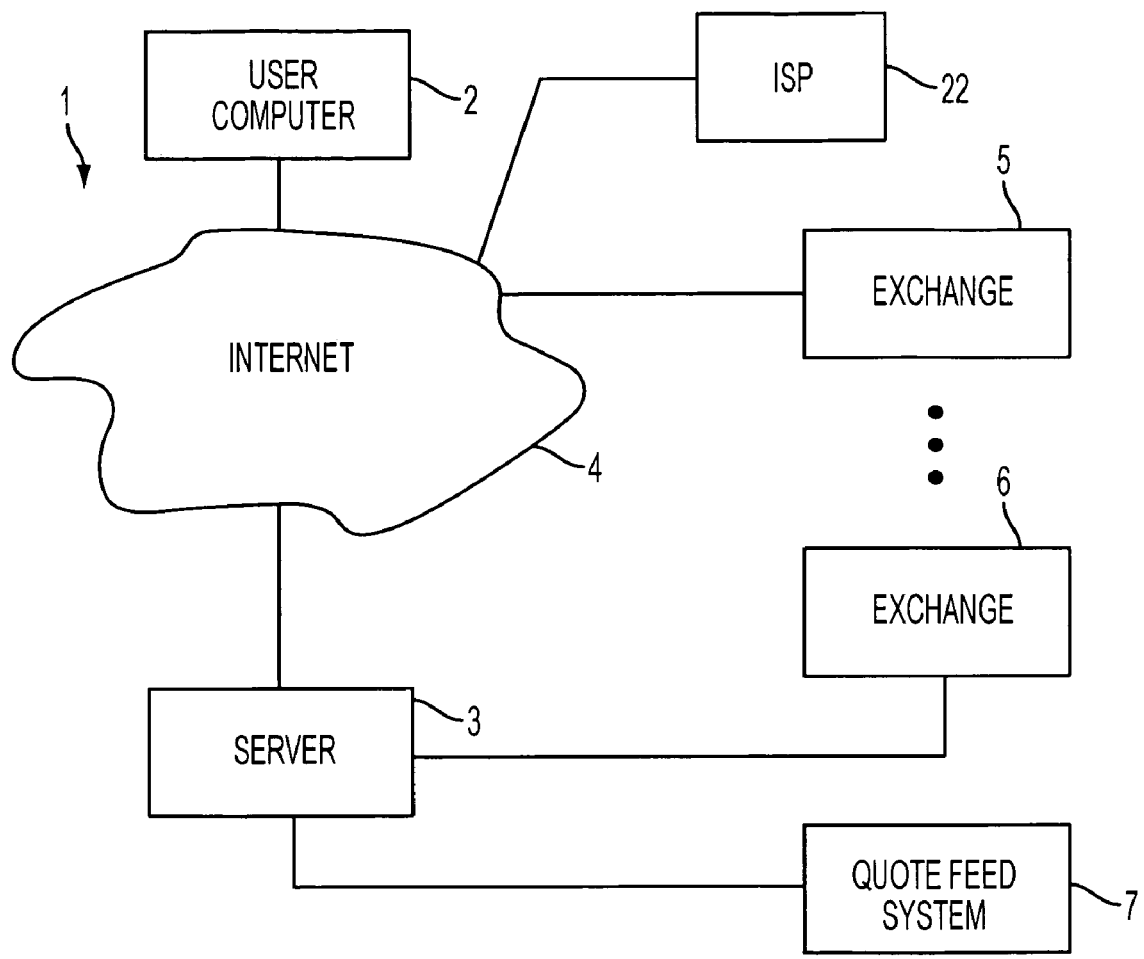
FIG. 1 depicts the hard ware component of the present invention.

The present invention is typically embodied in a system 1, as depicted in FIG. 1, where a user (or account holder or authorized account contact) operating at the users personal computer 2 typically obtains access to a trading system (or order management and/or electronic crossing or communication network) residing on one or more server computers 3 through a communications network 4, such as the Internet 4 using a conventional web browser, such as Microsoft Internet Explorer. The user via the personal computer 2 and server 3, techniques conventionally used in the Internet and using session data that allows a user session to be tracked, interacts with the server 3 via the browser of the computer 2 to create/define a basket of fungible goods that are owned/borrowed by the user and that can be traded (bought, sold, watched, etc.) as a unit (or security/investment vehicle) in a single transaction in real-time. The fungible goods can include one or more of stocks, bonds, etc. The basket can also be called an individual fund or an individualized portfolio/folio. Once the user has decided what action is to be taken, such as selling the basket, buying the basket, etc. the user initiates the action in a single initiation operation ("one click"). Then, the server 114, through the network 4 or over dedicated connections, interacts with one or more markets facilities such as exchanges 5–6, or market makers, for the desired goods to perform the action requested as a single unit. The prices of the fungible goods, such as stocks, are typically obtained using a conventional quote service 7, and used as needed, for example in determining the number of shares to purchase based on an amount of money being invested. The trades are made in real-time substantially simultaneously using a smart order router. For example, if the user has requested that the trading system buy 100 shares of stocks A and B traded on an ECN, such as The Island ECN, the trading system (3) will create conventional electronic orders for one hundred shares of each stock and submit the orders to the ECN. When each order is filled, the trading system will confirm the order to the user, such as by sending an order confirmation to the user via, for example, sending an e-mail via a private or public network. The confirmation is accessible by the user from the computer 2. The system also updates internal database records for the user allowing the user to obtain the status of the accounts within the trading system using the browser.

The system also includes permanent or removable storage, such as magnetic and optical discs, RAM, ROM, etc. on which the process of the present invention can be stored and distributed. The processes can also be distributed via, for example, downloading over a network such as the Internet.

The individual fund or basket is maintained as a unit throughout all system interactions and acts as a multi-issue trading vehicle or instrument. The basket is composed or created, ordered, confirmed, tracked, closed out and historically recorded as a unit like a security, such as or just like a single share of stock is treated as a unit.

In buying the basket of, for example, stocks, the user is allowed to specify a number of shares for each stock in an absolute shares user defined weighting for the basket. For example, the user can set an absolute number of shares (share weight) to buy/sell stock A at 133 shares (buy) and stock B at 275 shares (sell). The system will buy/sell the number of shares requested at the market price available at the time of the order. The system will attempt to obtain the "best" price for the number of shares requested using a smart order router.

The user can also set an absolute amount of money to be used to purchase shares. For example, the user can specify that $1000 of stock A be bought and $2350 of stock B be sold. The system determines the number of shares from the corresponding current bid/ask price and then trades the number of shares determined using the smart order router.

The user is also allowed to select among a number of options concerning how the money within the account is allocated among the stocks. The system allows the user to weight or balance the stocks according to proportional dollar weighting, such as equal dollar cost, capitalization weighting, etc. The system determines the number of shares to trade via the smart order router as:

stock shares=ratio*amount/price where the ratio is determined by the type of weighting.

For an equal dollar weighting where $1,000 is to be invested and stock A costs $100/share and stock B costs $50/share, the system will purchase for the user a number of shares using:

a ratio=1/number of stocks, such that ½*$1000/$100=5 shares of stock A and $500/$50=10 shares of stock B are purchased.

For a capitalization weighting where company A has a total capitalization of $1,000,000, company B has a total capitalization of $10,000,000, both stocks have a share price of $10 and $10,000 to invest, the system will buy a number of shares using:

ratio=stock capitalization/total stock capitalization of the stocks, resulting in $10,000,000/($10,000,000+$1,000,000)*$10000/$10=909 shares of stock B and ¹⁄₁₁*$10000/$10=91 shares of stock A being acquired.

For a price weighting where company A stock has an ask price of $15, company B stock has an ask price of $10 and $1000 is to be invested, the basket will include a number of shares using:

ratio=stock price/total of stock prices, resulting in $15/($15+$10)*$1000/$15=40 shares (or $600 worth) of company A and ¹⁰⁄₂₅*$1000$10=40 shares ($400) of company B being obtained.

For a percentage defined weighting of 80% of stock A and 20% of stock B with $20,000, stock A at $25/share and stock B at $20/share, the basket will include a number of shares using:

ratio=weighting/total weighting, resulting in 80%/100%*$20000/$25=640 shares of stock A and 0.2* $20000/$20=200 shares of stock B being purchased.

For a user defined ratio based weighting where the user is allowed to define the numerator of the ratio and the system computes the denominator for each stock ratio by summing the numerators. For example, if the user set user defined ratio numerators at stock A=58, stock B=42 and stock C=50, the system would produce a ratio for stock A of 58/(58+42+

50)=⁵⁸⁄₁₅₀ and obtain the proportionate amount of stock based on the current price and the amount to be invested.

The system can use other types of ratios such as the conventional Sharpe ratio as the numerator in the above user defined approach to weighting.

As previously noted, the present invention allows changes in a basket or individual fund to be measured (indexed) using an individual fund index (IFI). The IFI can be the net asset value (NAV), or a normalized percentage, etc. When using the percentage index, the value of the basket at a point in time is normalized to 100 and all measures of change are made with reference to this normalized index. For example, if the initial basket asset value is $300,000 (percentage index=100) and the asset value increases to $350,000 the percentage index becomes 116.6 or about a 16% increase.

Figure 2:
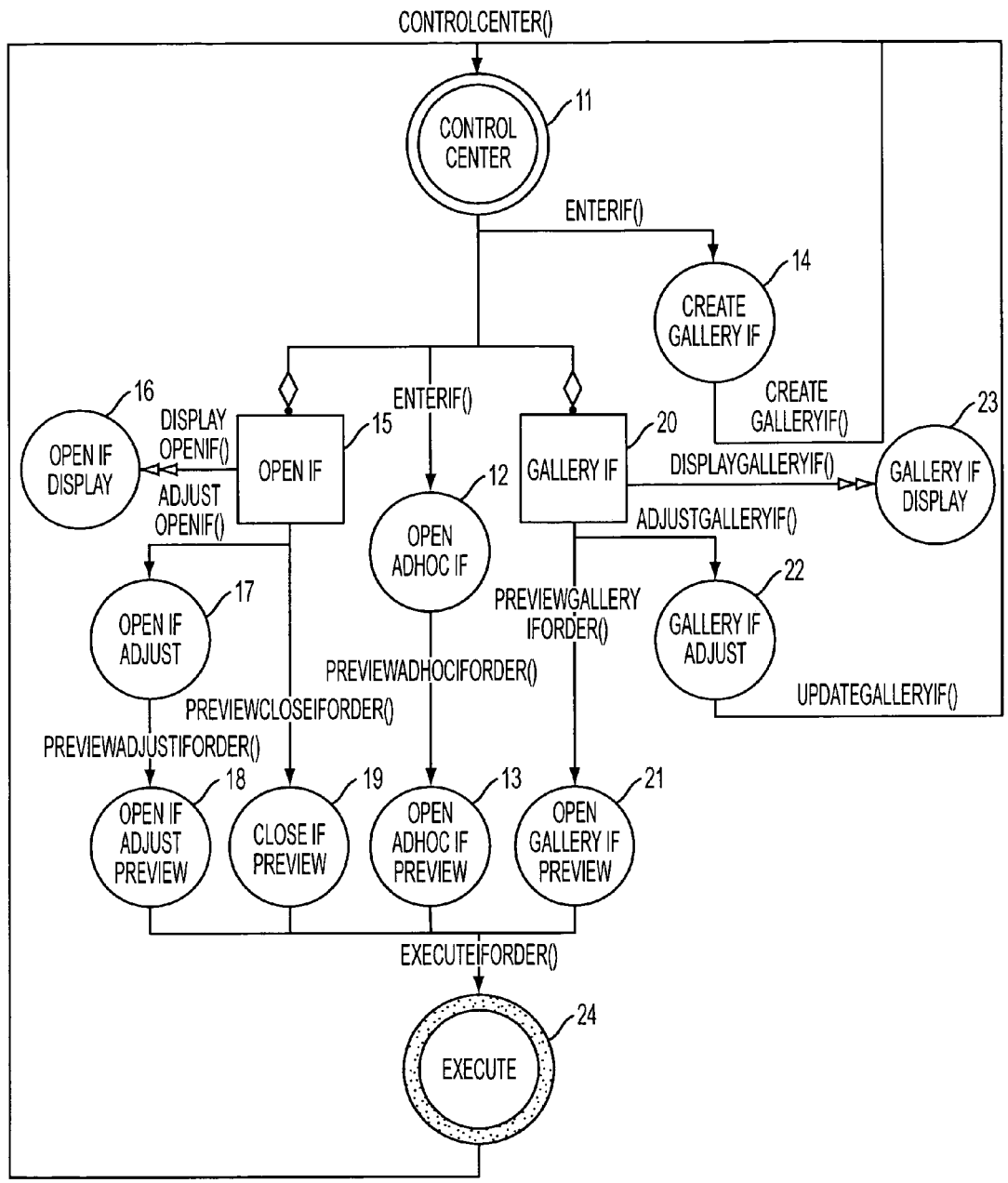
FIG. 2 shows a web state diagram for the interfaces produced in accordance with the present invention.

As depicted in FIG. 2, the interface system moves through a number of states (only some of which are shown for simplicity of explanation and where those not shown have similar paths) returning to a control center display 11 (see FIG. 4) either directly or through display cancel paths that are not shown. From the control center display state 11, the user can enter an ad hoc open basket or individual fund (IF) state 12 followed by a preview state 13 or open a gallery state 14 directly. The user can also perform a number of different selections through a pop-up window open basket operation 16, including entering into an open a basket state 16 (see FIG. 5), an adjust basket state 17 (FIG. 9), followed by a basket preview state 18 (see FIG. 6), and a close preview state 19 (FIG. 10). The user can also perform a number of different selections through a gallery operation 20 including entering a gallery preview state 21, an adjust gallery state 22 or pop-up window gallery display state 23. The system enters into an execution state 24 when any trades are ordered.

As noted above, the present invention allows a user at the user's personal computer 2 to access the trading system executing on the servers 3 over the Internet using a conventional browser. The user first accesses the trading system web site with a URL, such as http://www.unx.com, where the user is requested to enter a personal identifier (ID) which is associated with a level of authorization the user has to trading system functions and a password via a downloaded page, component or control, such as an HTML, XML, ActiveX, Java, etc. If the user is authorized, an account selection page 30 (see FIG. 3) is returned to the user's computer 2 and shows the accounts (only 1 account being shown in this figure) for which the user is authorized.

Figure 4:
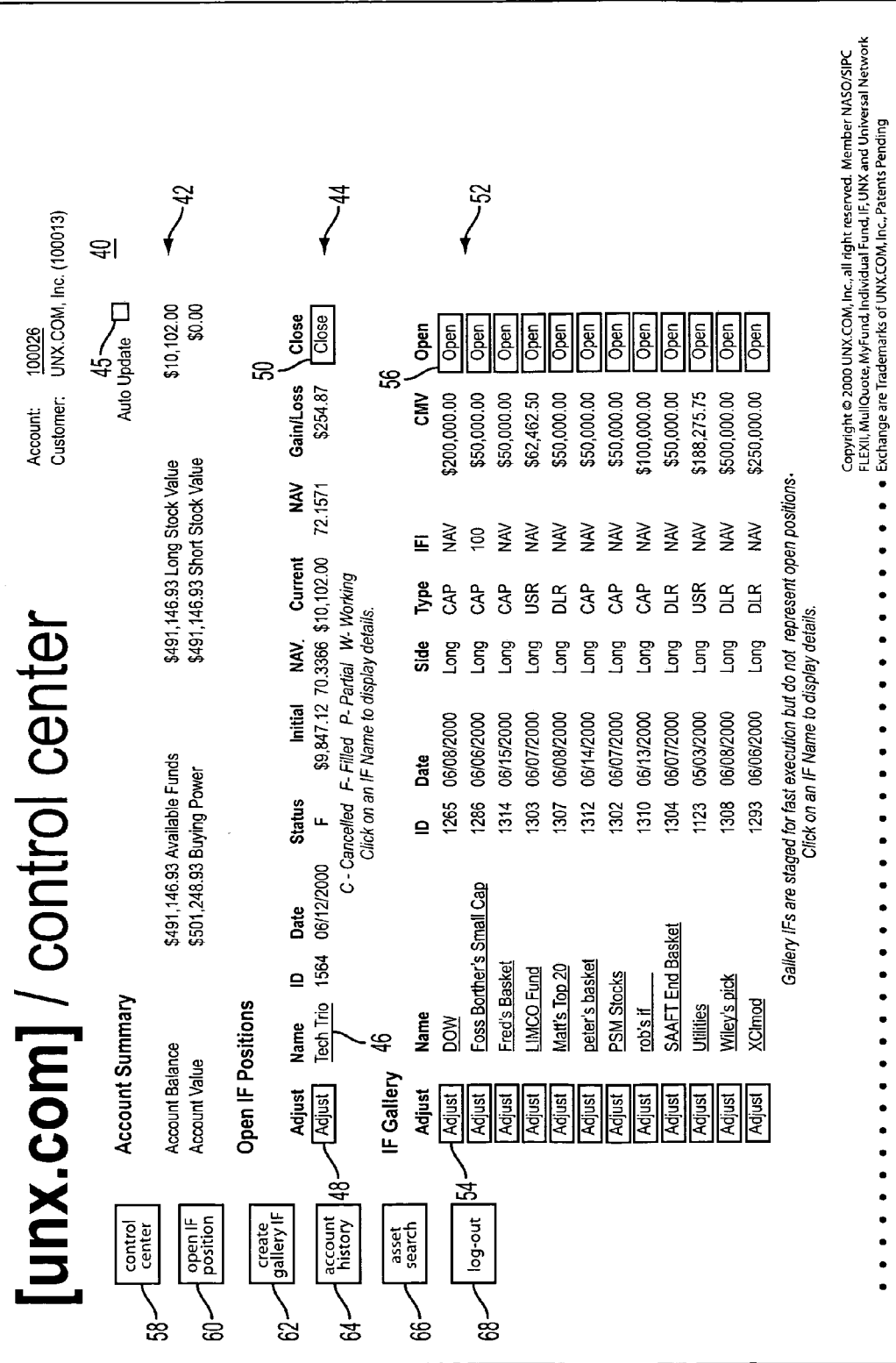
FIG. 4 depicts an account summary view or page.

This selection page 30 shows the account ID for each account, an account type, such as cash, margin, etc., a customer ID, a customer name and an access level 32, such as inquiry which allows read only access, design which allows basket or IF construction, trading which allows basket trading, full control which allows complete control, and sub-account control which allows this user to trade baskets for designated sub-accounts. Within this page 30 are conventional buttons or controls 34, such as ActiveX or Java controls, which the user can activate to select a desired account. When an account control 34 is activated, such as by using a mouse to "click-on" the control, a post occurs and the system servers 3 obtain from the system data base (see FIG. 26) the information for the account selected and return a control center or account summary page 40 as depicted in FIG. 4.

The summary view on page 40 shows account summary information 42, such as balance, value, available funds, buying power, long and short stock position values, etc. The page 40 also shows summaries of current open basket or individual fund (IF) positions with one such open IF position summary 44 being shown. The summary page 40 can be updated each time the page is accessed or updated if the auto-update control 45 is selected, which means that the last price of each good, such as the last price at which a stock traded, is obtained from an appropriate market and used to update the contents of the page 40.

An open IF is a basket which includes fungible goods, such as securities, etc. which the customer owns within that IF. The open summary 44 shows the name 46 of the IF the user has designated for the basket. The name field 46 is also a control that when activated causes the system servers 3 to download to the user's computer 2 an IF detail page (see FIG. 14) which will be discussed in more detail later. Additional information in the IF or basket summary includes the system ID for the IF, the date the IF or basket was opened, the status, the initial value, the initial net asset value (NAV), the current value, the current NAV and the gain/loss for the basket or IF. The summary also includes two controls 48 and 50. The adjust control 48, when activated, causes the system servers 3 to provide a page (see FIG. 9) by which the user can adjust the characteristics of the open basket, such as the securities in the basket or the weighting. This page will be discussed in more detail later. The close control 50 when activated allows the user to command the system servers 3 to close out the IF which involves trading (selling/buying as needed) any owned securities, options, etc. as a single transaction where the securities are traded substantially simultaneously in real-time.

The summary page 40 also depicts gallery IFs or baskets 52 which are sometimes called watch lists. Each gallery summary has similar information to the open summary while providing additional information such as the side of the position which indicates whether the gallery is a short or long position, a type weighting such as a dollar (DLR) weighting, an individual fund index (IFI) type which indicates the type of basket measure being used for evaluating the basket and the current market value (CMV) of the gallery. The gallery summaries 52 also include an adjust control 54 and an open control 56. This open control 56, when activated, allows the user to command the servers 3 to trade (buy/sell) the goods (securities, etc.) of the gallery basket in a single transaction as a single unit where all of the goods are traded substantially simultaneously.

The summary page 40, as well as others of the pages which will be discussed later, includes a set of controls that provide access to additional functions within the system. A control center control 58 returns the user's computer to display of the summary page 40. The open IF position control 60 is the control that a user activates when a new individual fund or basket is to be opened in the market, that is, trade the securities as specified such as buy stocks and sell borrowed stocks (see FIG. 5). The create gallery control 62 allows the user to create a gallery. The account history control 64 results in the servers 3 providing a page that shows the history of the account (see FIG. 16). The asset search control 66 allows the user to search for a particular asset among the assets held in the baskets of the account (see FIG. 11). The log-out control 68 logs the user off the system.

Figure 5:
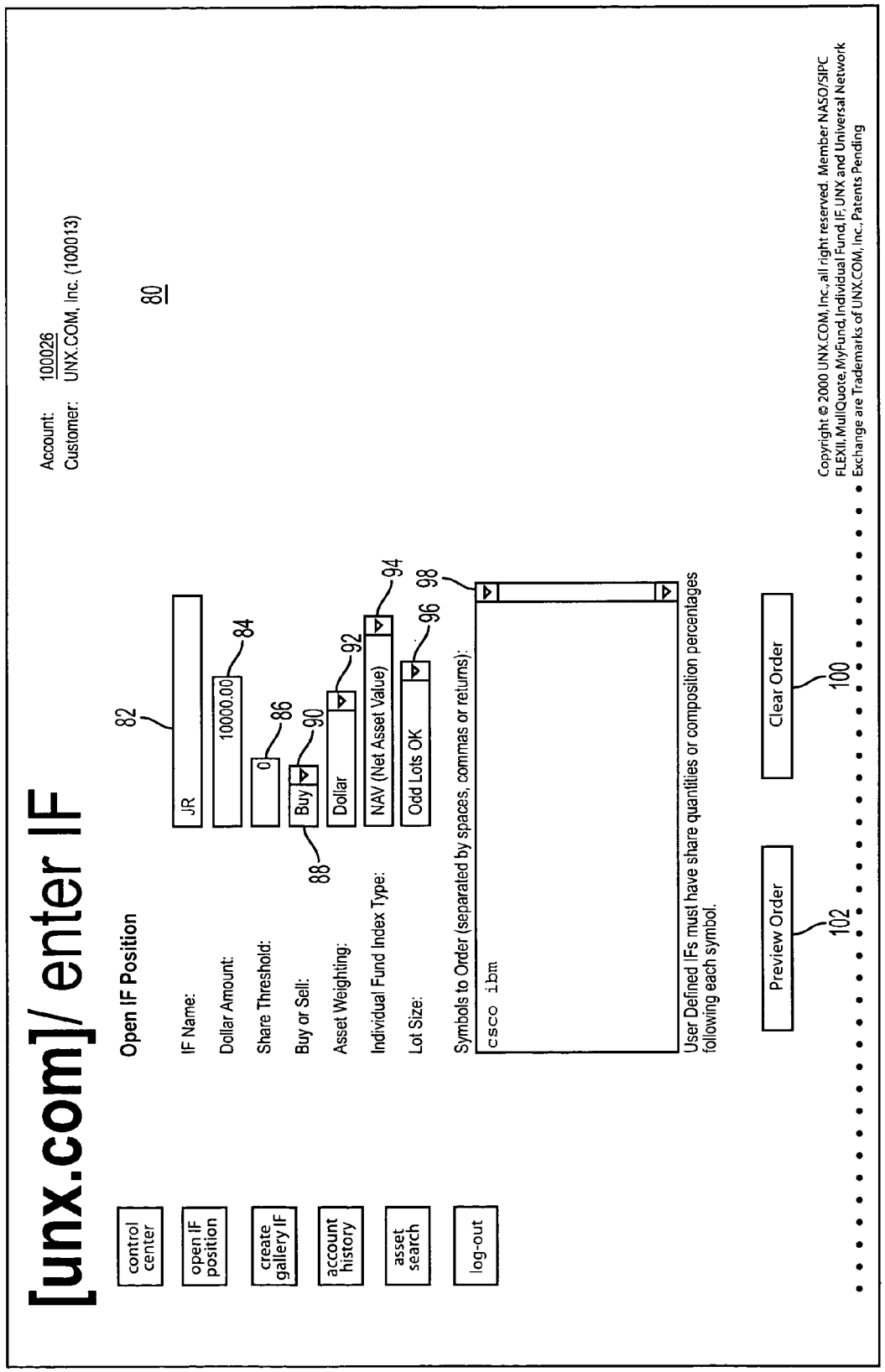
FIG. 5 shows an interface page for opening a basket.
Figure 6:
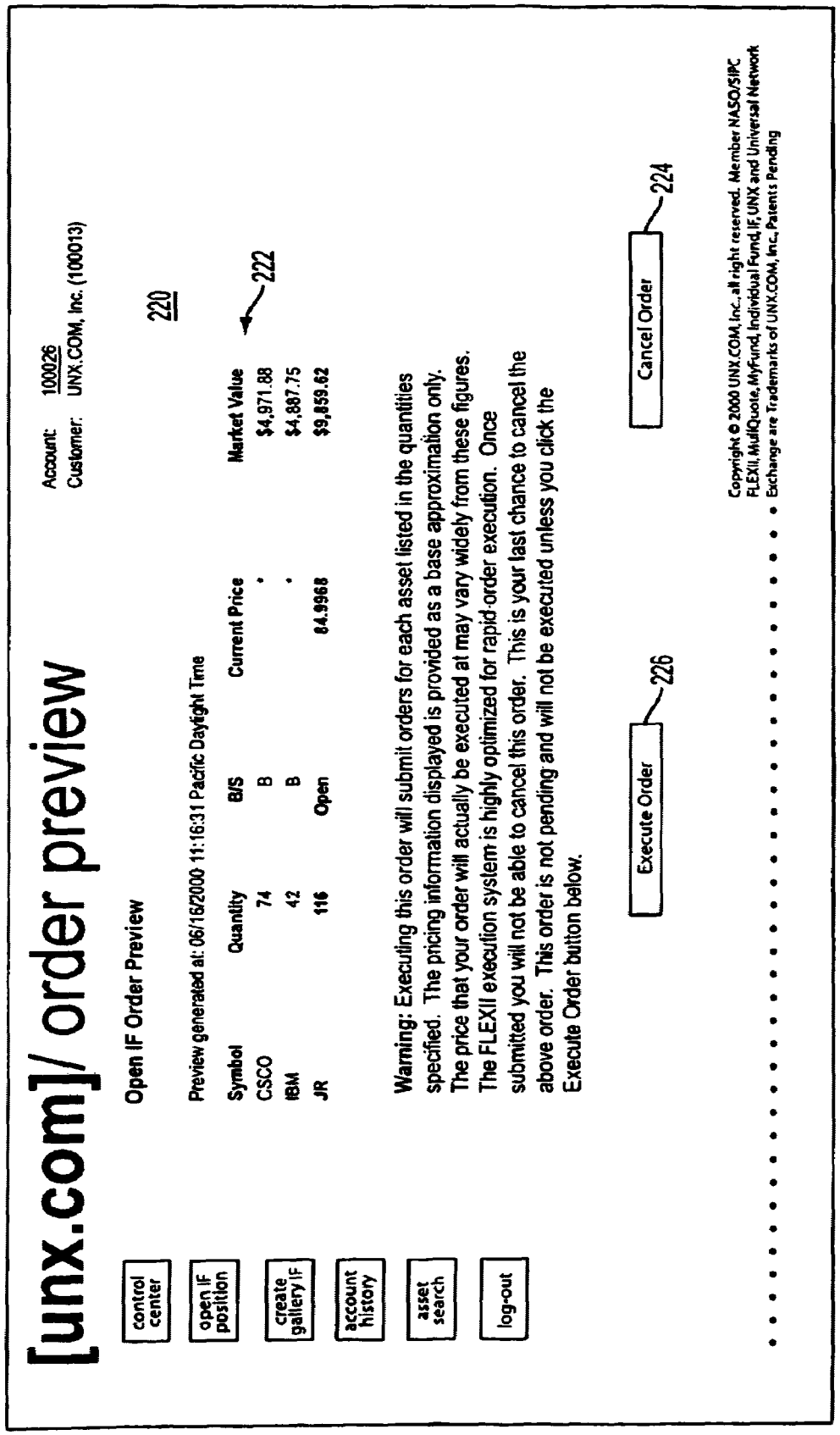
FIG. 6 illustrates an order preview.

In a typical situation where the user is going to open an IF or basket the user will activate the open IF position control 60 on one of the pages presented to the user at the computer 2 by the servers 3. The servers 3 will respond by transmitting an Open IF position view on page 80 as shown in FIG. 5 to the computer 2 via the communications facilities 4. This page includes several fields that have default values (such as those defaults shown in FIG. 5) and which the user can change as well as fields that the user completes. A name field 82 is used by the user to give an individualized name to the individual fund or basket being opened. The name field 82 of FIG. 5 shows the name JR. An investment amount field 84 is used by the authorized individual to specify how much money will be invested in the basket where this page shows $10000 to be invested in this basket. A share threshold field 86 is used to specify a minimum number of shares to trade. A buy/sell field 88 allows the user to identify whether the goods specified in the IF are to be bought or sold with the default being "Buy". In this field the user has a conventional pull down control 90 which presents the user with the available options for the field 88. A weighting field 92, with pull down control, allows the user to select from among several different types of asset weights as previously discussed. The index type field 94, with pull down control, is used to select the type of index (NAV, etc.) by which to measure the progress of the basket. Field 96, with pull down control, is used to select a threshold for purchases, such as round lots (share purchases in 100 share increments), odd lots (shares in integer increments), etc. An asset selection field 98 allows the user to enter a list of the identifiers of the goods to be purchased. Each asset identifier needs to be an identifier by which a good can be uniquely identified in a particular goods market which in the stock markets are trading symbols, particularly stock trading symbols. However, it is possible to use other unique identifiers such as company names if they are unique. FIG. 5 shows the symbols for the stock of the companies Cisco and IBM. This field can also be used to specify individual goods weights as when the user is entering a user defined weighting. These weights can be specified as percentages, such as 13%, or in shares, such as 120 shares, or using other types of ratios. The ratio can be a negative value allowing the user to "borrow" or take a short position on an asset. As will be discussed later herein, a routing identifier can also be entered allowing the user to specify the destination of the order for the particular asset. If the user is dissatisfied with the selections made the user can change them individually or can activate a clear order control 100. If the user is satisfied, the user can activate the preview control 102 which causes the servers 3 to parse the asset list in field 98 to obtain the goods trading identifiers, determine the individual assets weights, obtain trade prices (bids/ask, etc.) for the goods using the identifiers, such as the stock symbols of stocks to be traded and determine the number of shares of each good as previously discussed. The servers 3 then present the information about the IF to be ordered via an order preview page or view 220 as depicted in FIG. 6.

The open position page of FIG. 4 specifies a basket name of "JR", an investment amount of $10,000, a 0 share threshold, a share buy, an equal dollar weighting, an NAV index and an odd lot size for buying Cisco and IBM. The order preview page 220 of FIG. 5 shows preview information 222 including the date and time of the preview, the symbols of the goods being traded, the name ("JR") or "symbol" of the individual fund or basket that included the goods, the quantity of each good as well as the total number of goods of the IF, the status (buy/sell/open) and the current price of each asset (not shown in this example), the current price of the basket (essentially what would be the current NAV) and the market values. If the user is not satisfied with the order, the order can be canceled using the cancel control 224 and the display returns to the control center display. If the user is satisfied, the user activates the execute order or trade control 226 with a single initiation selection action (mouse click) which, via a post, causes the system to servers to execute trade orders for the basket as a unit. The system servers 3 produce trade orders for the goods specified in the preview in the manner previously discussed. The open preview (as well as the gallery preview) can also include bid, ask and last prices for each of the assets.

Figure 7:
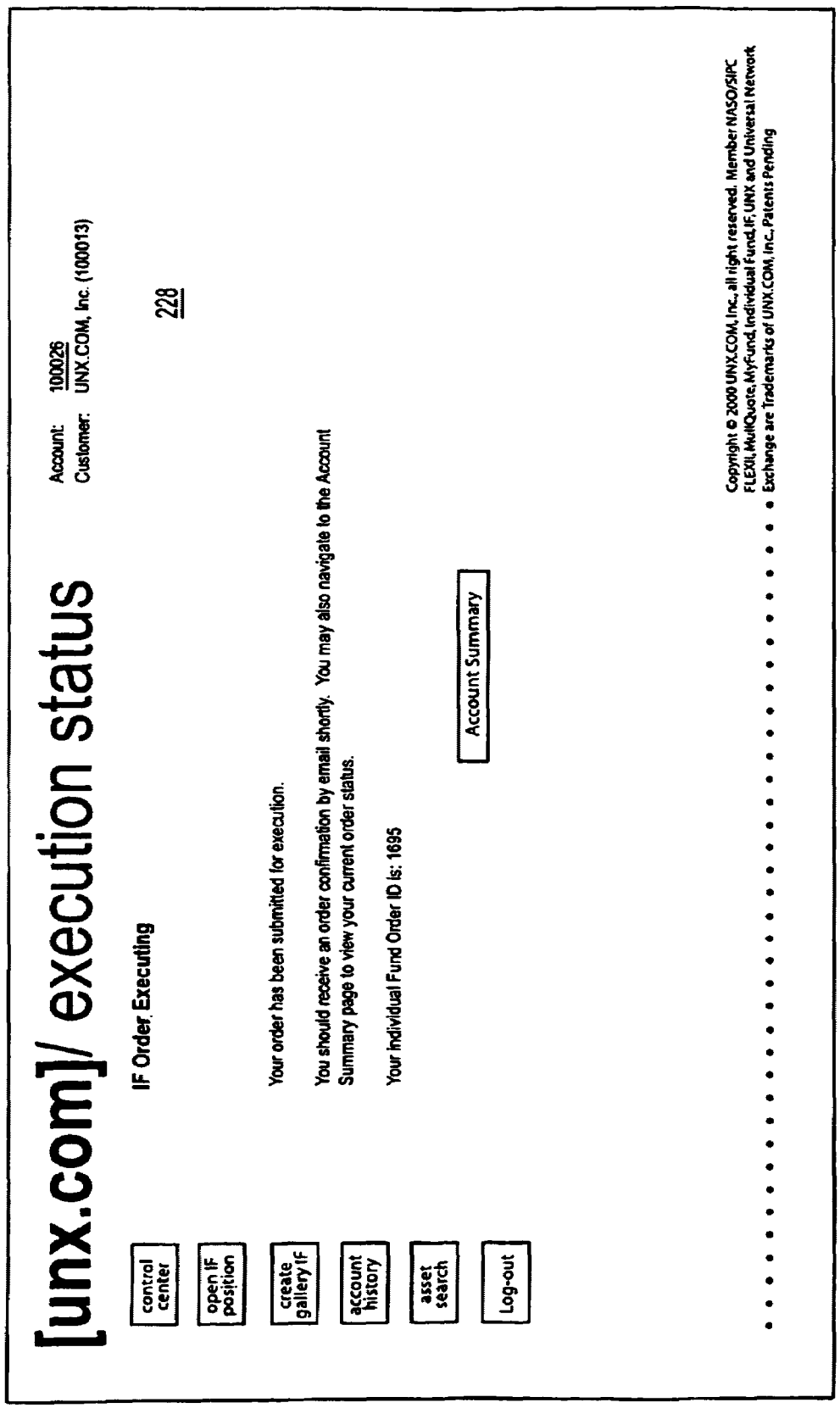
FIG. 7 shows an order executing page.

Once the orders are being executed the user is provided with an order executing page 228 (see FIG. 7). When the orders are complete, the trader can be provided with a confirmation 229 by e-mail as shown in FIG. 8. The e-mail confirmation shows the asset ID 230, the asset symbol 231, the name or description 232, the security identifier 233, the time 234 of the trade where if a trade for a particular asset is accomplished in increments each of the increments will be shown, the side 235 of the trade, the number 236 of shares, the price 237 (of the asset and the NAV of the basket), the principle 238 or amount of money invested, the commission 239, the fee 240 for the trade and the total amount of money spent. Additional information associated with the account is also shown including the broker 251, the account ID 242, the customer name 243, the customer ID 244, the contact ID 245, the position 246 or state of the position, the trade date 247, the settlement date 248, the e-mail confirmation date 249 and the destination(s) 250 of the message. This information is stored in a database system having a database structure depicted in FIG. 26 and which will be discussed in more detail later.

When the user activates the gallery open control 56, the system provides an order preview which is substantially the same as discussed above.

When the user desires to adjust an open individual fund or basket, the user can activate control 48, and an adjust open IF page 260 (see FIG. 9) is prepared and presented. This view on page 260 allows the open IF to be re-balanced (balanced) or otherwise adjusted. The page 260 provides information 262 about the current position and has fields where the user can make adjustments to the IF. The user can add/subtract money from the IF via a flow field 264. The weighting of the basket/IF can be changed via field 266 which includes a pull down menu of options. The share threshold for re-balancing can be set via field 268. The user can chose not to trim overbalanced positions by selecting field 270 and can re-balance in round lots only by selecting field 271. Individual goods can be added to or removed from the basket by making appropriate changes to the list of identifiers in field 274. The order shown on the page 260 can be canceled via activating control 276 or previewed via activating control 278. The system then performs the necessary operations to determine what trades need to occur as previously discussed. For example, if the page 260 specifies an equal dollar weighting, with stock A set at a weighted $10,000, the current value of the holdings of stock A are $15,000 and stock A trading at $10, the system would determine that $5000/$10=500 shares of stock A need to be sold. This interface also allows assets to be moved via a move button 279.

When the user wants to create a gallery IF and activates control 62, the system presents the user with a create gallery page. This page is much like the Open IF page 80 of FIG. 5 except the controls for preview and clear of the open page 80 are replaced with a create gallery control and a clear form control, respectively. When the create gallery control is activated, the servers 3 perform the functions of the open IF operations where the invested amount, weights, buy/sell, share thresholds, index type and lot size information is used to determine a number of shares of each good listed in the goods order list. The created gallery is added to the list of galleries for this account and then appears on the summary page 40.

A gallery is essentially a form area that displays staged or "gallery baskets" and is in a representation of a basket or individual fund (IF) with no asset records. The value of a gallery is live at the current market value which results in interface pages containing galleries being updated substantially continuously. This is implemented using a separate set of servers 3 than used to enter orders, etc. Galleries are updated by essentially continuously accessing a list of galleries within the system in a round robin fashion, obtaining the symbols for the assets of the gallery, obtaining last price quotes for the assets from a quote service, and determining the number of shares responsive to the weighting, share price and amount. For galleries having a fixed number of shares as the weighting, the live prices determine the value of the basket while the value of the basket remains the same with the number of shares of each asset changing for other types of weightings. Galleries are stored in a database (see FIG. 27) separate from the account database of FIG. 26.

The gallery adjust control 54 operates in the substantially the same manner as the adjust basket control 48 except that adjusting an open basket causes a trade where adjusting a gallery just updates the saved gallery basket, the user is presented with a list of the goods in the gallery basket and the controls allow the gallery to be updated with changes or deleted, like the create and clear controls mentioned previously.

During the period when an IF or basket is open, the user may decide to close an open IF by activating control 44 (see FIG. 4). When the control 44 is activated, the system servers 3 prepare and provide to the user computer 2 a close order page 280 as shown in FIG. 10. This page 280 has closing position information 282 such as the date and time, the symbol or each good as well as the symbol or name for the basket, the buy/sell/close status, the current price of each good and the NAV of each share of the IF or basket, and the market values. The page 280 also includes a close field 284 for each good where the user can deselect each of the goods for close-out. This allows the user to close out less that the entire basket. The detail page display continues to show the basket as containing all of the original stocks (that is, all of the original symbols will be listed) but some of the stocks will shown with no shares. As an alternative, the display could show the composition of the basket as changed, i.e. the detail display list would only show the symbols of the stocks that include shares (long or short position). All of the close fields can be deselected with the un-check control 286 and the user can then select the goods to close out by changing the fields 284 individually. If the user is not satisfied with the close order it can be canceled via activating control 288 and the user will be returned to the control center display. If the user is satisfied, the execute order or trade control 290 can be activated and the system creates the trade orders and executes the trades as previously discussed. Once the orders have started executing the user is provided with a trade executing page as previously mentioned.

Figure 11:
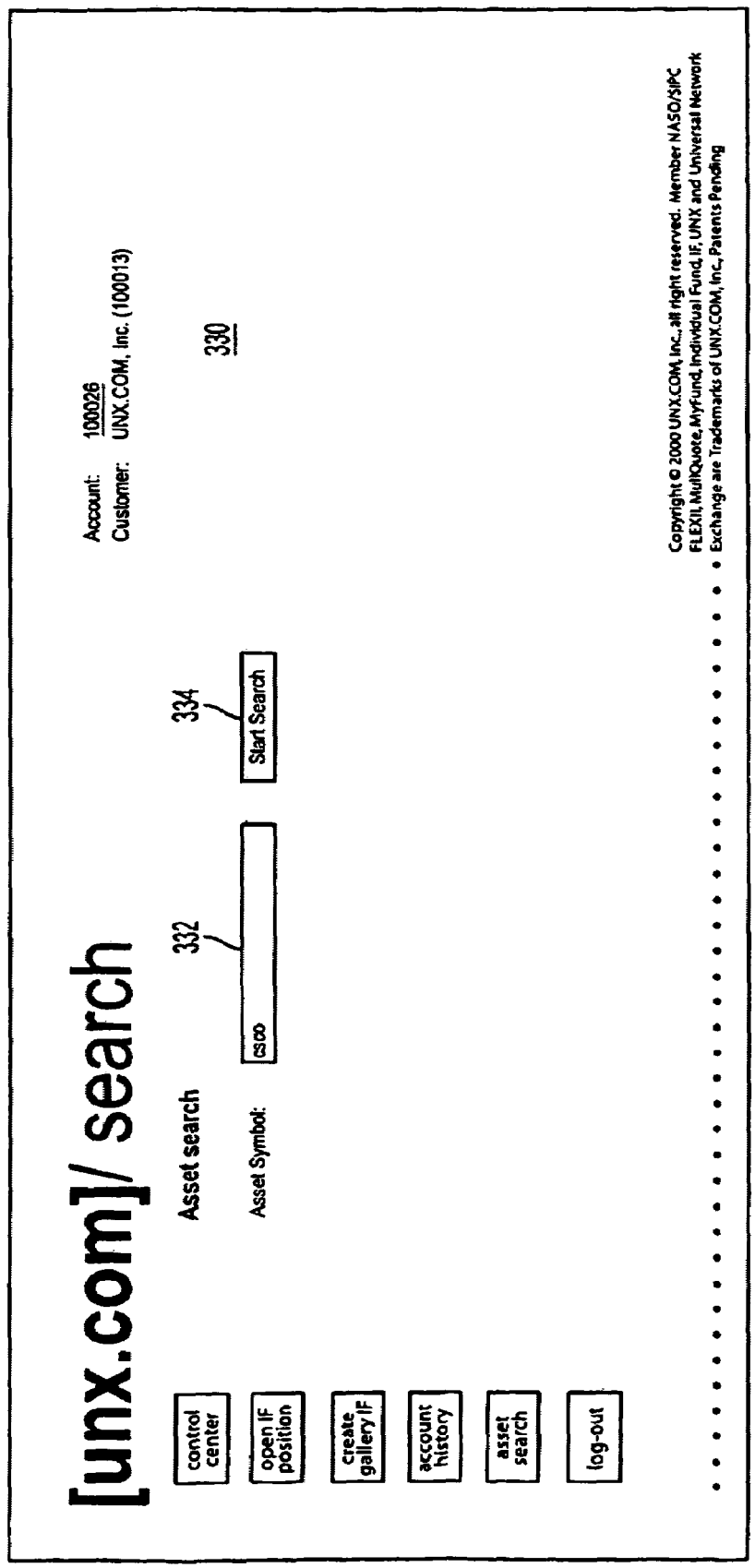
FIG. 11 shows an asset search page.
Figure 12:
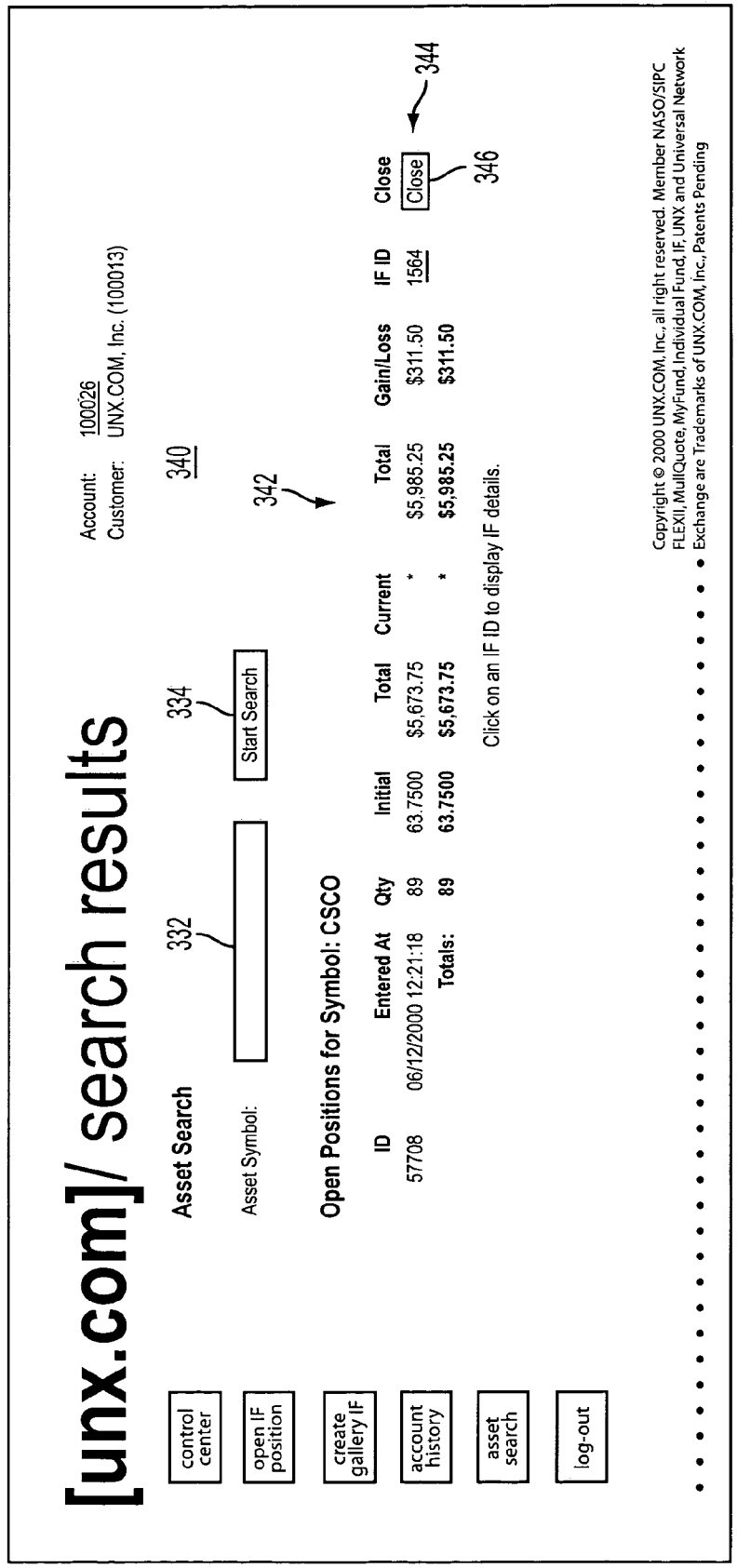
FIG. 12 depicts an asset search interface.

The user can close out an individual good within an (or all) IF(s) through the asset search control 66 which when activated results in the servers providing a search page 330 as shown in FIG. 11. This search page 330 includes an asset symbol field 332 where a unique identifier for a good is entered. FIG. 11 shows the symbol for Cisco as the asset for which a search is being conducted. When a start search control 334 is activated, the servers 3 search the database of the users accounts for IFs which have the asset of concern and provides a search results page 340 (see FIG. 12) page 340 allows further searching and also provides information 342 concerning the open positions for the asset/good of concern for each basket in which the good is a part. That is, the result of the search shows the concentration of any single asset within an account across multiple baskets or individual funds. A summary 344 is provided for each good where FIG. 11 shows only one good, the Cisco stock. This information 342 also includes totals for the various types of information provided by each asset summary. Each summary 344 includes a goods ID (system identifier), date and time of the goods acquisition, a goods quantity, an initial purchase price and total initial value, current asset price and current total value, gain/loss and an IF ID field which is a control that can be activated to view the details of the particular basket in which the good is found. The individual asset can be closed (bought/sold as required) by activating a close control 346 associated with the asset as previously discussed.

As previously noted, a user can select a particular basket for a detailed review or view of the basket contents by selecting the basket name from the summary page 40 of FIG. 4. FIG. 13 (page 380) shows the contents of the gallery IF named DOW and depicted in detail in FIG. 14. The information 382 provided includes the symbols, quantity, buy/sale status, current price and market value. The page 380 also allows the user to execute the gallery via control 384 which results in an order preview page, as previously discussed, being presented. Although not shown in this example the basket can hold positions on both sides of the market.

An asset detail view or page 410 for an open IF which is obtained when the name of an IF is selected (control 46) from the summary page 40 is shown in FIG. 14. This detail page 410 provides current information 412 about the assets of the individual fund (IF) or basket. The information includes the date and time of the report, goods ID, the name/symbol, the date and time the asset was acquired, the quantity or number of shares, the share price at acquisition, the principle invested, the commission, any fee, the net money, current price, the current market value and the gain/loss. The page 410 also includes an executions or view control 414 which will cause the servers to provide a transaction view or page 420 as shown in FIG. 15. The page 410 can be accessed from the executions page 420 via assets control 422. The information provided in page 420 is the same as in page 410 but shows all of the executions that occurred for this IF.

Figure 16A:
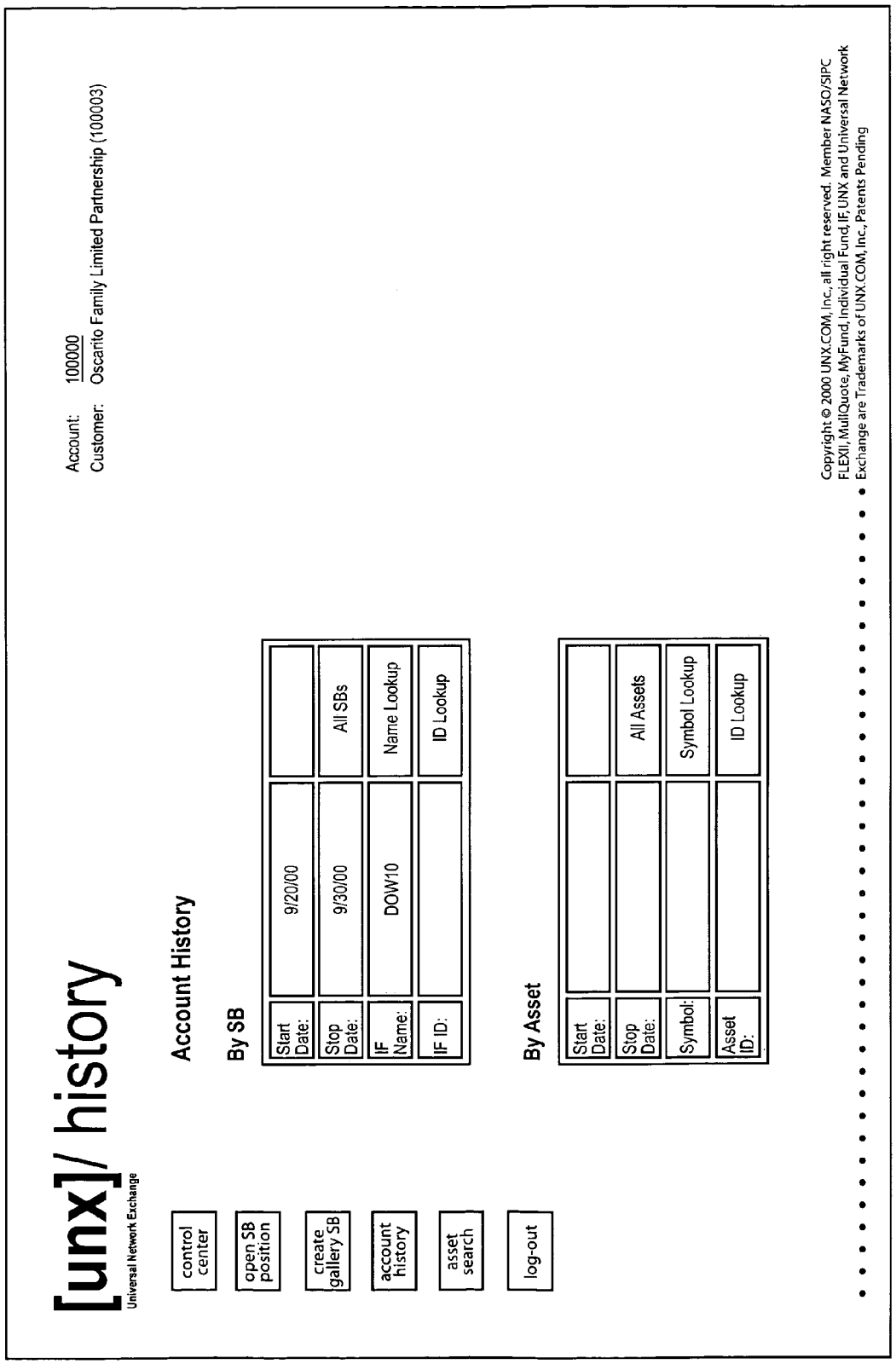
FIG. 16(16a–16g) depict an account history views.

If the user wants to see the entire history of the accounts to which the user has access, the user activates the account history control 64 (see FIG. 4) and the servers 3 access the system database, prepare and provide to the user computer 2 a history view. The history view includes several different displays as depicted in FIGS. 16a–16g. The interface of FIG. 16a allows the user to select a history by stock basket (SB) or by asset. An all baskets stock basket history as shown in FIG. 16b displays all baskets opened in the specified date range (or last 30 days if range is left empty). A name lookup displays baskets with the given name (see FIG. 16c) allowing the user to examine strategy performance. An SB ID lookup displays a single SB (FIG. 16d). An all assets history is like the all SB but displays assets (FIG. 16e). A symbol lookup like is like the name lookup but displays assets (FIG. 16f). An asset ID lookup is like SB ID lookup but displays an asset (FIG. 16g).

Figure 26:
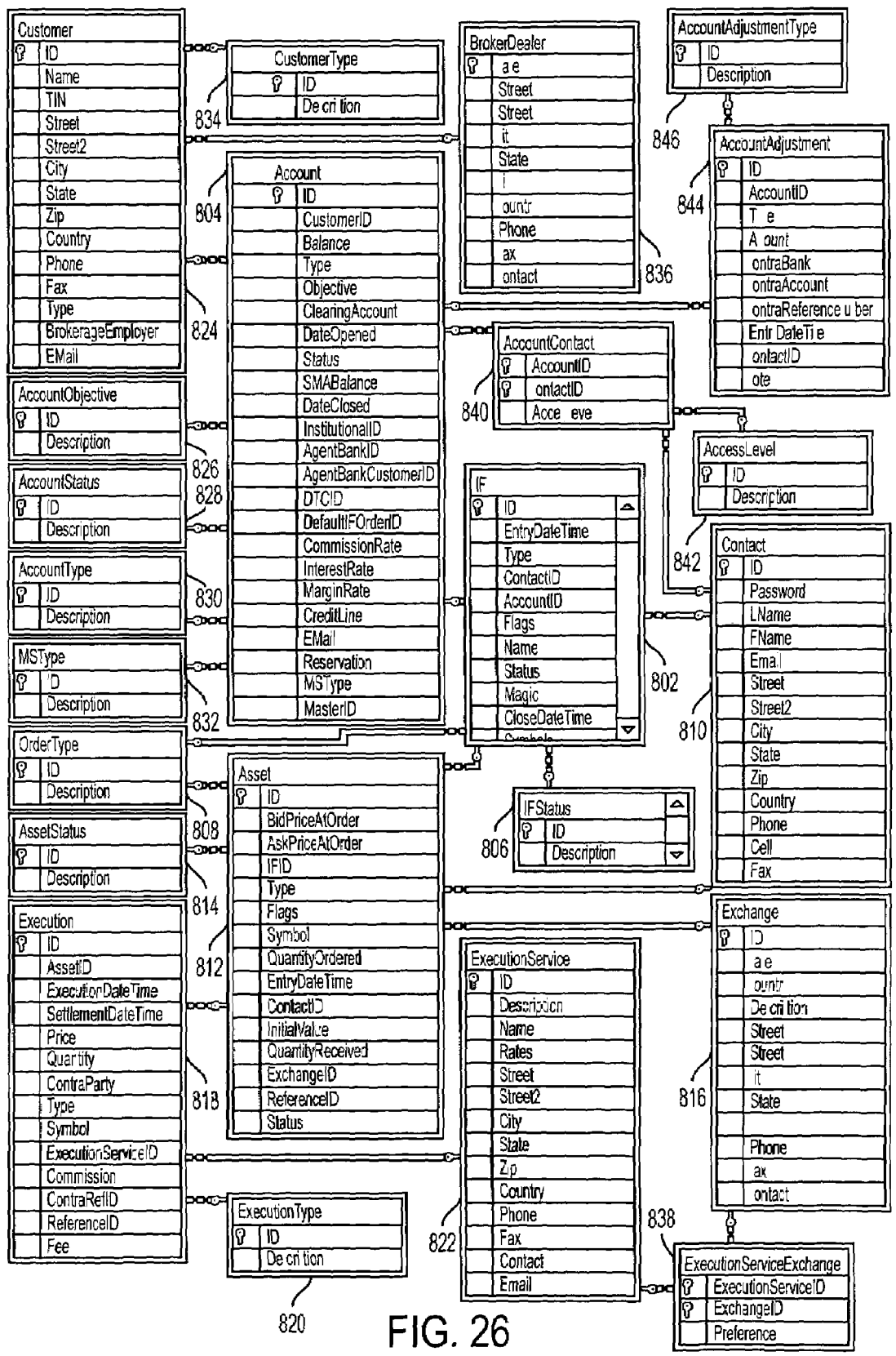
FIG. 26 and FIG. 26a depict an account database.

A history search, as well as an asset search, is preferably performed by joining the appropriate tables of the database of FIG. 26 and using the symbol, account ID and basket ID as appropriate to search the joined table.

The present invention also allows a user to move assets from one basket to another. To do this the user selects the move function for a particular basket at the adjust screen (FIG. 9) and is provided with a move screen page 510 as depicted in FIG. 17. This figure depicts a move from the current basket where the aggressive growth basket is shown. The user selects the target basket into which assets will be moved using a preview button 512. The user is provided a list of the assets of the current basket similar to the page 410 of FIG. 14 and is allowed to individually select which assets to move using check boxes. When the user initiates the move by selecting a complete move button, the system changes the IF pointer (IFID) in the asset record of the database depicted in FIG. 26 from that of the current basket to that of the target basket.

The user is also allowed to rotate between different types of baskets. A rotation involves trading only those assets of the source and destination basket required to change the amount invested from one basket to another and moving those assets that do not need to be traded. For example, the user may own an aggressive growth basket and want to rotate into a DOW basket. When this is desired the user is provided a display page 550 as depicted in FIG. 18 showing the source and destination baskets. The user selects a preview button 552 of the target basket and the system shows the user a preview similar to that previously discussed but which shows the trades which will be performed to accomplish the rotation. Note that the shares needed in the new or target basket are determined in the same manner as previously discussed using the amount to be invested (the amount in the old basket), the basket weighting of the new basket and the assets of the new basket in the same way that the number of shares is determined for a preview of an open basket function. To create this preview the system creates a table including the new, old and preview (net) trades as depicted below. Assume that the old basket had shares 50 shares of stock A, 28 shares of stock B, 37 shares of stock C and 50 shares of stock D and that the target or new basket is to include 75 shares of stock A, 100 shares of stock E and 200 shares of stock, the exchange or rotate table will look like:

| Stocks | Net Trade | Old IF | New IF |
|--------|-----------|--------|--------|
| A | 25 | 50 | 75 |
| B | -28 | 28 | 0 |
| C | -37 | 37 | 0 |
| D | 0 | 50 | 50 |
| E | 100 | 0 | 100 |
| F | 200 | 0 | 200 |

Exchange Table

When the rotation is initiated, the system 3 makes the trades and the moves necessary to create the new basket moving 50 shares of A, buying 25 shares of A, selling all of shares B and C, moving the shares of D and buying the shares of E and F.

Figure 20:
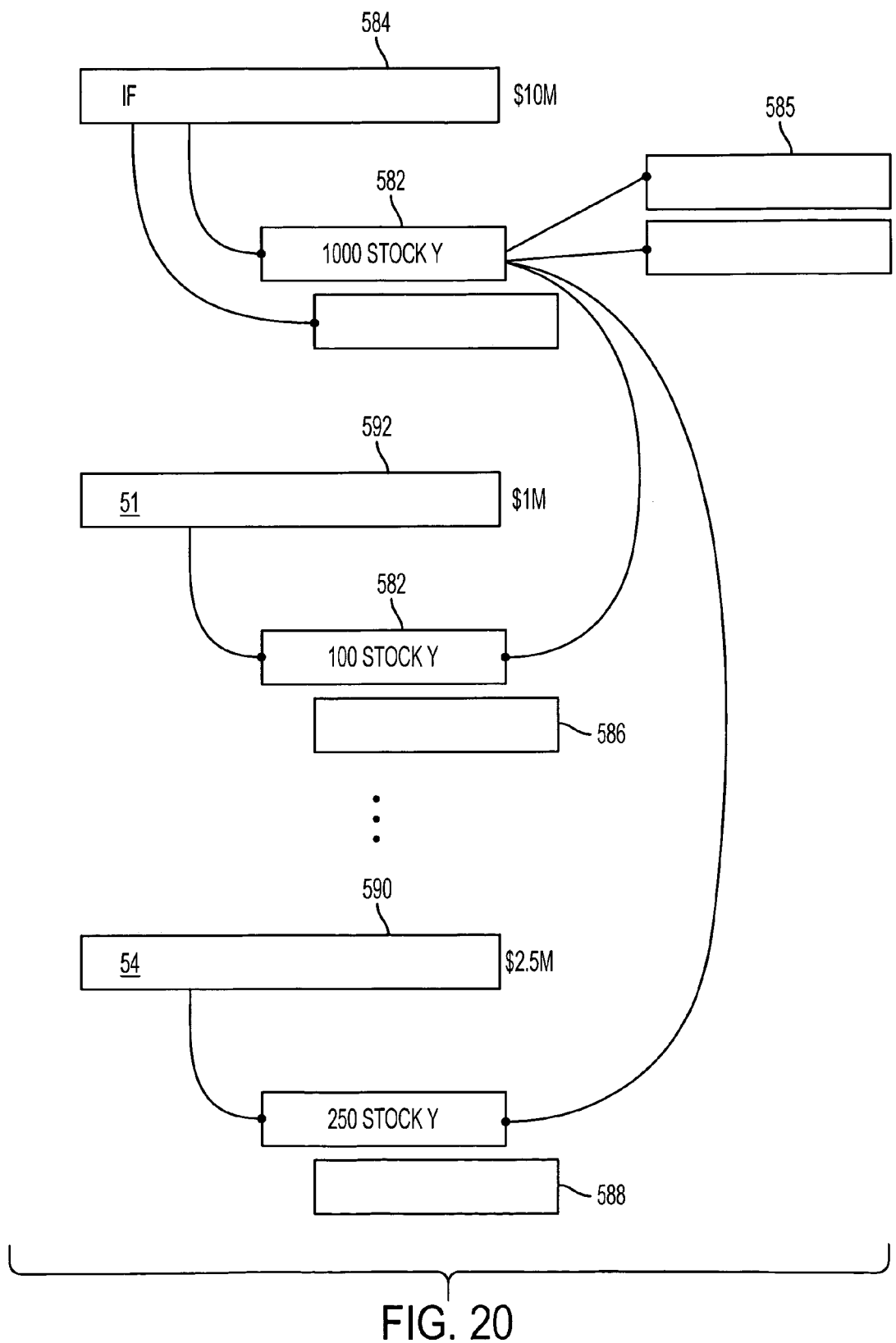
FIG. 20 shows assets relationships between master and sub-accounts.

The present invention allows a user to own a number of different baskets within an account. It is also possible for an account holder to delegate authority over a portion of or all of the assets in the account to a master account. A master account can also control assets from a number of different account holders. Any trades, gains, losses, etc. by the user of the master account are proportionally reflected in the sub-accounts over which the master account has control. For example, assume that master account A includes 100 million (M) dollars contributed by sub-accounts S1=$10M, S2=$15M, S3=$50M and S4=$25M. If the master account user buys $10M of the technology basket, each of the sub-accounts would be allocated a portion of the purchase such that S1=$1.5M of the technology basket, S2=$1.5M of the basket, S3=5M of the basket and S4=$2.5 of the technology basket. Of course any underlying asset such as stocks are owned by the subaccounts in the same proportion. For example, 1000 shares of stock Y with the same contributions as noted above would be would be allocated in proportion such that S1=100 shares, S2=150 shares, etc. A data structure such as depicted in FIG. 20 stores these allocations.

Figure 19:
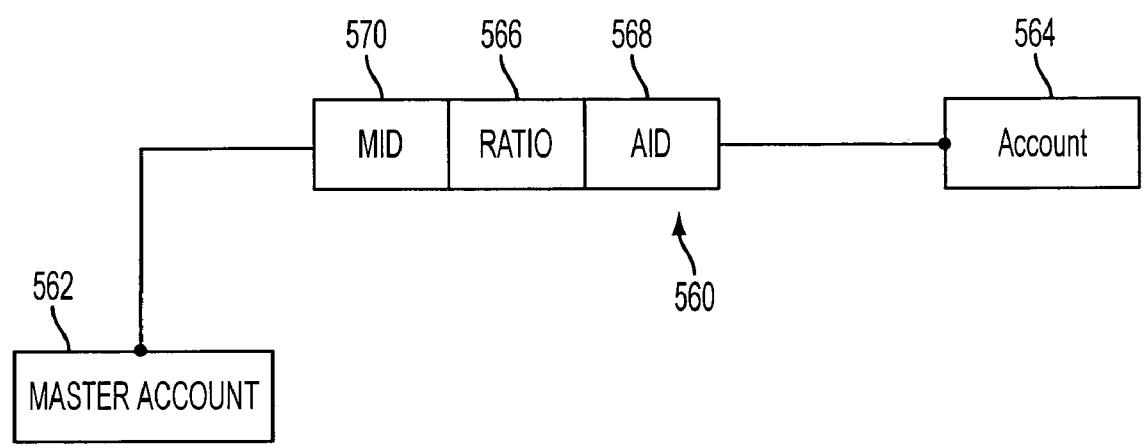
FIG. 19 shows a link table for master and sub-accounts.

Rather than having the proportions of the subaccount allocated to the master account being determined by principle allocations, the allocations can be provided by a table data structure 560 (see FIG. 19) linking the master account 562 to the sub-account 564 and which includes a ratio field 566 and identifiers 568 and 570 (or pointers) to the related master and sub-accounts.

An asset record (see FIG. 20) of a type called a spanning asset record 582 is linked to the master basket 584, and to the spanning asset record are linked a number of execution records 585 for that asset. From these links the master basket value, etc is determined. The spanning asset records are linked to asset records 586 and 588 in each of the subaccounts. These asset records are linked to the corresponding IF records 590 and 592 in the corresponding subaccounts. The value of the basket in the subaccounts is determined from these assets. A view of the master account or the subaccounts is obtained through a summary page, such as previously described, and accessible through the account selection and control center pages, such that the master account user can see the entirety of basket(s) controlled from the master account and the subaccounts owner can see only those portions of the assets allocated to and owned by the subaccounts. The account selection screen includes a field showing whether each account is a master account. The master account user also has access to a subaccounts contribution page 600 as depicted in FIG. 21 which shows the contributions of each of the subaccounts to the master account in a principle contribution field 602 and allows the master account user to view the subaccounts by activating a view button 604.

When a user is trading a basket on a basket exchange or ECN the user places an order for a basket trade using an interface 610 as depicted in FIG. 22. This page 610 includes a field 612 for a basket name to be traded, an investment amount field 614 and a minimum trade amount field 616 which indicates the minimum increment size (like a lot size) in which the basket is to be traded. A trade type or side field 618 allows the user to specify whether the trade is a buy or sell while a pair of mutually exclusive selections 620 allow the user to specify whether the order is a market order indicating that the order is to be executed at the prevailing market prices or a limit order having a limit price and other constraints at which the trade is to be executed. When the limit order selection is activated a limit price is provided in a limit field 622. The user can also select when the limit order will be placed on the basket ECN as an order using a stop selector 624 and a stop price in field 626. The user is allowed to select a weighting for the basket using field 628. The user also is allowed to specify a variance in field 630. The variance allows a trade to take place when an exact match between the order specified by this screen and the market does not exist but is within the variance. The user can also specify the time the limit order will be in force in a time in force (TIF) field 632. A list field 634 shows the asset symbols of the basket and which the user is allowed to edit. Preview and clear buttons 636 and 634 operate as previously discussed.

When the user has created either a basket or a gallery that is allowed a variance the summary screen page 650 includes a variance field 652 as shown in FIG. 23.

Figure 25:
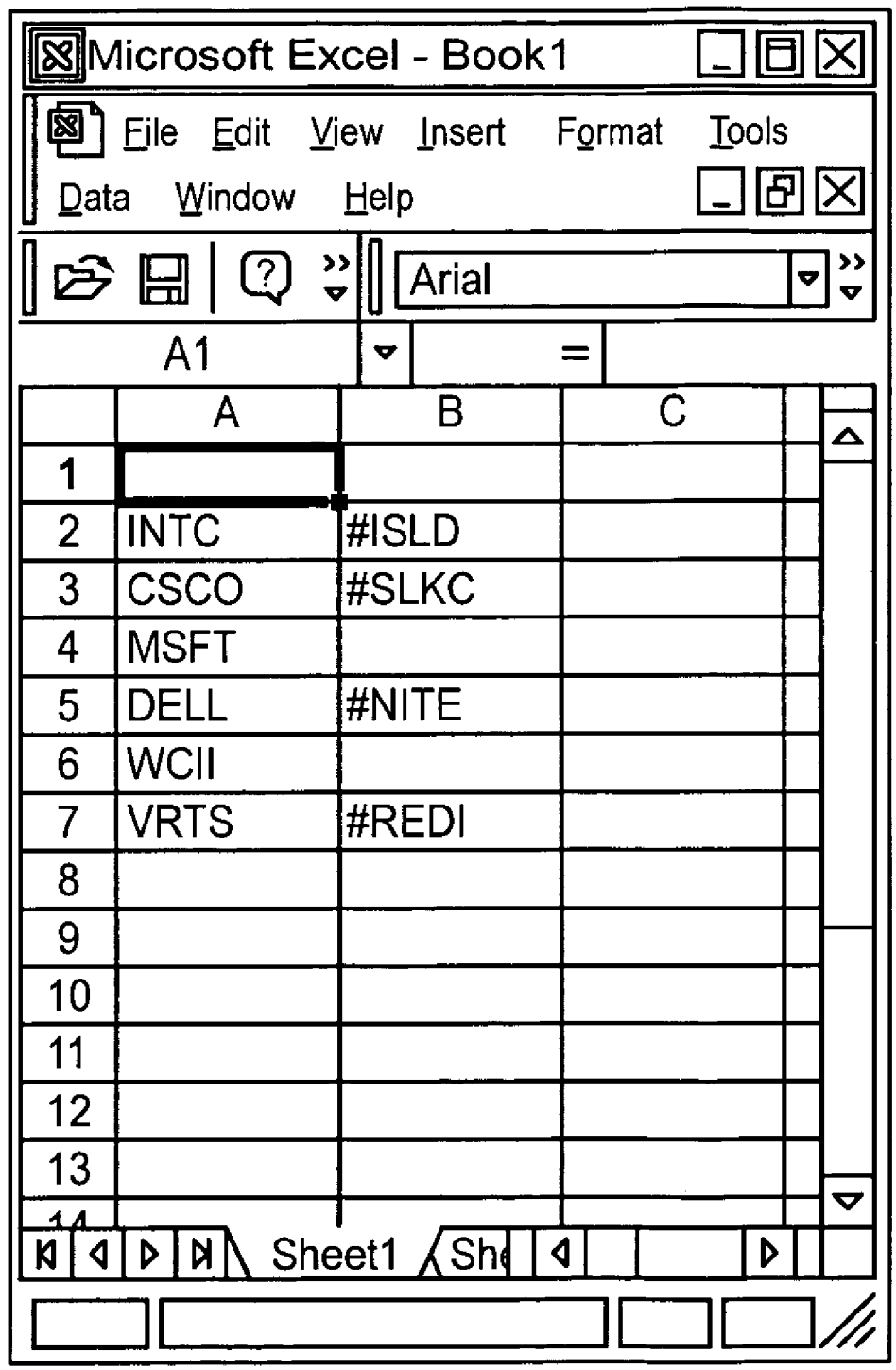
FIG. 25 depicts a spread sheet.

When making a trade the user is allowed to specify a destination for or to custom route a trade of a particular asset. For example, the user may desire that stock P be traded with market maker R because the user has a special relationship with that market maker. To do this the user, in an open page 660, places trade destination identifiers 662 adjacent to the assets as depicted in FIG. 24. A trade destination identifier includes an identifier 666 which is preferably a "#" and a symbol 668 identifying the destination. For example, ISLD is the symbol for The Island ECN mentioned previously and SLKC is the identifier for the SLKC Capital Markets market maker. The user can enter the symbols for each of the destinations into the open page 660 individually or can block copy the assets symbols and destination symbols from a spread sheet 672 as depicted in FIG. 25. Another alternative is to provide the possible destinations as a list on the page 660 allowing the user to block copy the desired destination from that list.

Figure 26A:
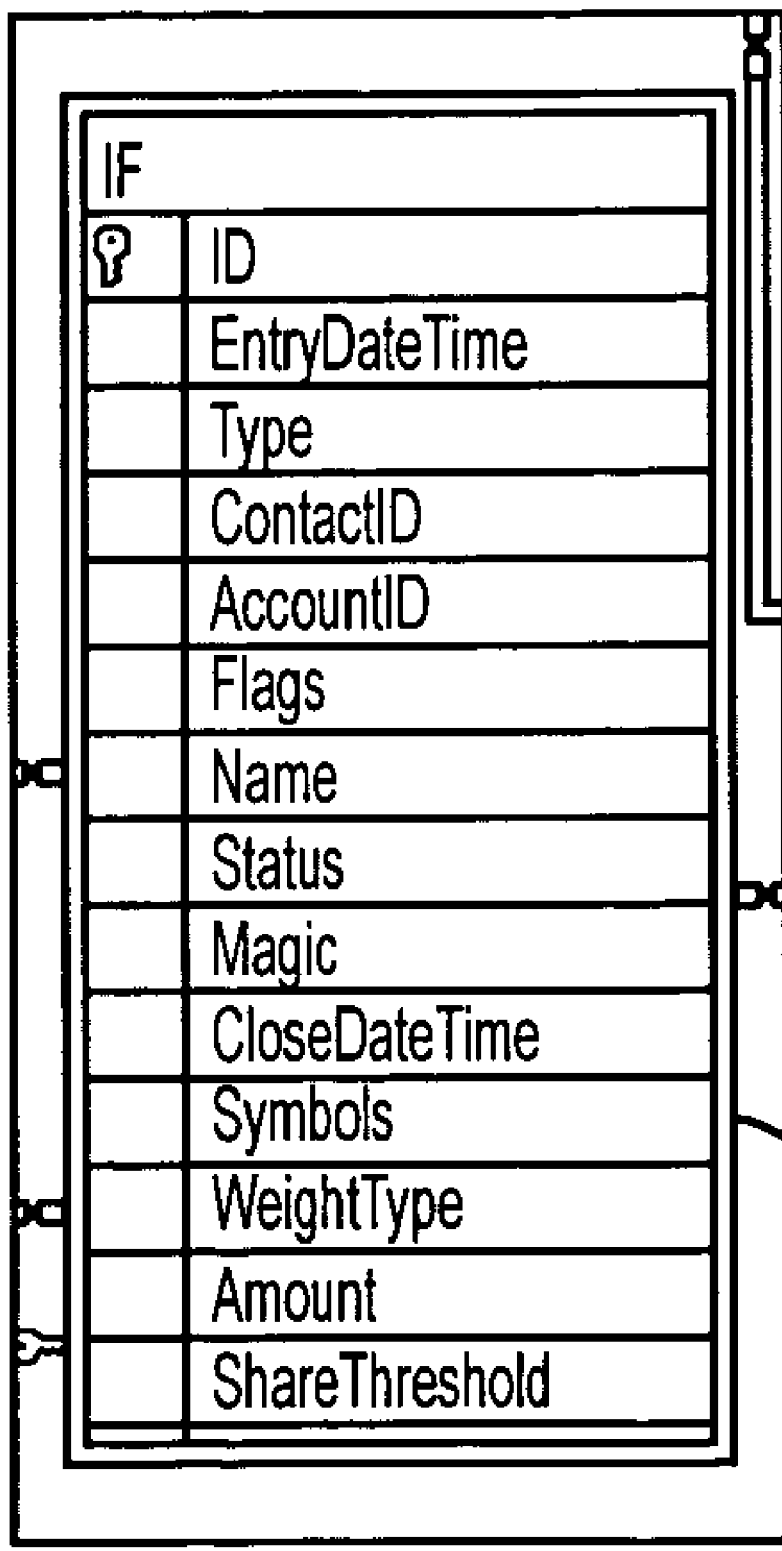

A system account database, which can be part of an SQL database system, has a structure as depicted in FIG. 26. (Note FIG. 26a shows record 802 in more detail.) The database includes a basket record 802 for each basket or individual fund (IF). The basket record includes fields for the basket identifier (key), the entry day and time of creation, the type of basket, the contact identifier, the account identifier, basket flags, the name of the basket, the basket status (open/closed), the magic converter for infusions of capital, etc., the close date and time, the symbols of the basket, the basket weighting, the amount of money invested in the basket, and the share threshold.

The basket record 802 is linked to an account record 804, an IF status record 806, an order type record 808, and a contact record 810. The account record 804 includes fields for the account identifier (key), the customer identifier, the account balance, the type of account, the objective, the clearing account, the account opened date, the account status (open/closed), the SMA balance, the account closed date, the institutional identifier, the agent bank identifier, the agent bank customer identifier, the DTCID, the default IF order identifier, the commission rate, the interest rate, the margin rate, the credit line, the e-mail address, the reservation, the MS type, and the master identifier. The IF status record 806 includes fields for the IF status identifier, and the description. The order type record 808 includes fields for the order type identifier, and the description. The contact record 810 includes fields for the contact record identifier, the password, the last name, the first name, the e-mail address, the street address, a second street address, the city, the state, the zip code, the country, the telephone number, the cellular telephone number, and the facsimile number.

An asset record 812 is linked to the basket record 804, the order type record, an asset status record 814 and an exchange record 816. The asset record 812 includes fields for the asset identifier (key), the bid price at order, the ask price at order, the IF identifier, the type, the flags, the symbols, the quantity ordered, the entry day and time of creation, the contact identifier, the initial value, the quantity received, the exchange identifier, the reference identifier, and the status. The asset status record 814 includes fields for asset status identifier, and the description. The exchange record 816 includes fields for the exchange identifier, the name, the country, the description, the street address, a second street address, the city, the state, the zip code, the telephone number, the facsimile number, and the contact.

An execution record 818 is linked to the asset record 812, an execution type record 820 and an execution service record 822. The execution type record 820 includes fields for the execution type identifier, and the description. The execution service record 822 includes fields for the execution service identifier, the description, the name, the rates, the street address, a second street address, the city, the state, the zip code, the country, the telephone number, the facsimile number, the contact, and the e-mail address.

The account record 804 is linked to a customer record 824, an account objective record 826, an account status record 828, an account type record 830 and a master account type record 832. The customer record 824 includes fields for the customer record identifier, the customer name, the TIN, the street address, a second street address, the city, the state, the zip code, the country, the telephone number, the facsimile number, the type, the brokerage employer, and the e-mail address. The account objective record 826 includes fields for the account objective identifier, and the description. The account status record 828 includes fields for the account status identifier, and the description. The account type record 830 includes fields for the account type identifier, and the description. The master account type record 832 includes fields for the master account type identifier, and the description.

The customer record 824 is linked to a customer type record 834 and a broker dealer record 836. The customer type record 834 includes fields for the customer type identifier, and the description. The broker dealer record 836 includes fields for the broker dealer name, the street address, a second street address, the city, the state, the zip code, the country, the telephone number, the facsimile number, and the contact.

An execution service exchange record 838 is linked to the execution service record 822 and the exchange record 816, and includes fields for the execution service exchange identifier, the exchange identifier, and the preference.

An account contact record 840 is linked to the contact record 810, the account record 804 and an access level record 842. The account contact record 840 includes fields for the account contact identifier, the contact identifier, and the access level. The access level record 842 includes fields for the access level identifier, and the description.

An account adjustment record 844 is linked to the account record 804 and an account adjustment type record 846. The account adjustment record 844 includes fields for the account adjustment identifier, the account identifier, the type, the amount, the Contra Bank, the Contra Account, the Contra reference number, the entry day and time of creation, the contact identifier, and notes. The account adjustment type record 846 includes fields for the account adjustment type identifier, and the description.

The magic field in the basket record 802 is used to adjust a weighted value responsive to changes in the underlying assets such as an inflow of additional money. Adjustments for events such as stock splits automatically happen. For example, assume that a basket worth $10M includes 100,000 shares of stock resulting in a net asset value of $100. If a stock dividend of 1000 shares worth $100,000 occurs the NAV becomes $10.1M/101,000 shares or $101. However, if the owner adds (inflows) an additional $1M into the basket for a total principle of $11.1 M without adjusting/rebalancing the number of shares, the computed NAV would be $11.1 M/101,000 shares=$109. This is an incorrect number because the value of the shares held in the basket has not changed. The magic value is a value that will correct the number of shares to reflect the actual NAV. The magic value is CMV/CNAV where CMV is the current market value and the CNAV is the current NAV. In this example the magic value would add 9,800 shares to the share count resulting in $11.1/109,000 shares=$101, the correct NAV.

Figure 27:
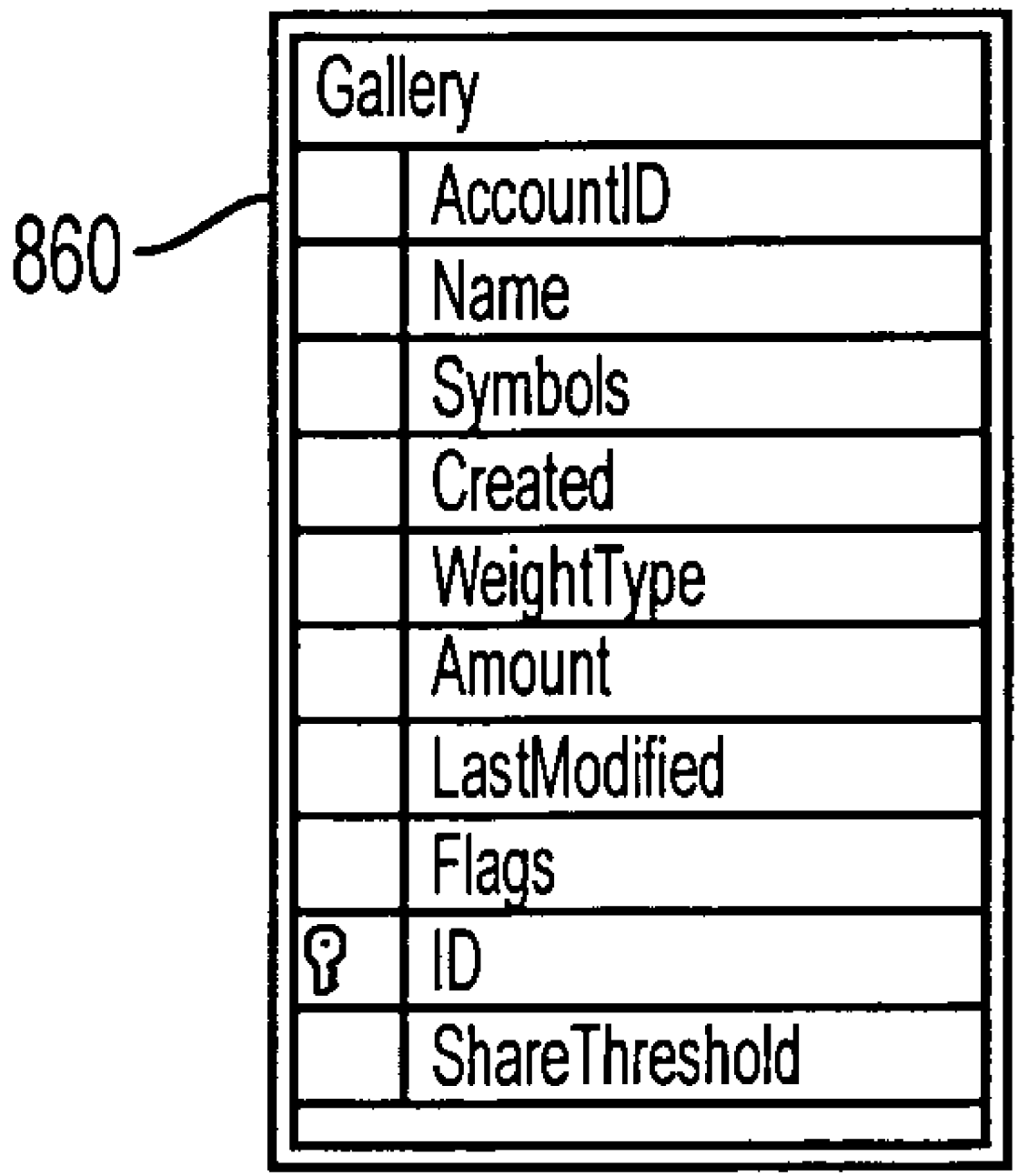
FIG. 27 shows a gallery database.

A gallery database, as depicted in FIG. 27, includes gallery records 860 each including an account ID field, a gallery name field, a field containing a list of the assets symbols of the gallery, a created date field, a weight type field, a potential; investment amount field, a last modified field, a flags field which can indicate a short or an exempt sale, an ID field which includes the unique ID of the gallery and a share threshold field which specifies the minimum number of stores to order per equity.

The system has been described with respect to operating with stocks, however, the invention can operate with other fungible goods including options, commodities, bonds, derivatives, tradeable assets or liabilities or any combination thereof, financial assets, securities, foreign or domestic equities, american depository receipts (ADRs), corporate paper, unit investment trust shares, options, warrants, notes, limited partnership interests, private placement securities, foreign currencies, contracts, futures, bank loan syndication interests, debts, pollution rights, global warming rights, insurance claim interests, debt, real estate, etc.

The many features and advantages of the invention are apparent from the detailed specification and, thus, it is intended by the appended claims to cover all such features and advantages of the invention which fall within the true spirit and scope of the invention. While the invention has been illustrated and described in detail in the drawings and foregoing descriptions, the same is to be considered as illustrative and not restrictive in character, it being understood that only the preferred embodiment has been shown and described and that all changes and modifications that come within the spirit of the invention are desired to be protected. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:
1. A system, comprising:
a server coupled to a goods trading market and trading fungible goods via the market; and
a user computer coupled to the server and allowing a user to specify a basket comprising at least two fungible goods tradable via the market using an interface to initiate trading by the server, wherein the interface comprises:
a basket open view comprising a name field where the user defines the name of the basket, an investment amount field where the user specifies an investment amount, a buy/sell field, a share threshold field where the user specifies a share trade threshold, a weighting field allowing a user specified weighting, an index type field where the user can specify a measurement index, a lot size field where the user specifies a purchase increment and an assets field where assets of the basket are specified;
a basket trade view comprising a name field where the user defines the name of the basket, an investment amount field where the user specifies an investment amount of an order, a minimum amount field where the user specifies a increment for trading the basket, a buy/sell field, an order type field where the user specifies a type of order, a limit price field where the user specifies a limit price for the basket, an order entry field where the user indicate whether the limit order is to be issued based on a condition, a condition field specifying a condition for issuing the order, a weighting field allowing a user specified weighting, a variance field where the user can specify a variance of the order, a time-in force field where the user sets a time limit of the order and an assets field where assets of the basket are specified;
a summary view showing existing and potential baskets;
a relationship view of a relationship between a master account and a sub-account;
a basket balancing view where the user can specify a balance among goods of the basket;
a basket detail view of basket contents;
an asset order detail view;
a trade execution view;
a history view;
an asset search view;
an asset move view;
a basket rotate view; and
gallery basket view.

* * * * *